US 12,113,717 B2

United States Patent
Dalmiya et al.

(10) Patent No.: US 12,113,717 B2
(45) Date of Patent: Oct. 8, 2024

(54) DYNAMIC PACKET BUFFERING DURATION

(71) Applicant: QUALCOMM Incorporated, San Diego, CA (US)

(72) Inventors: Vishal Dalmiya, San Diego, CA (US); Xing Chen, San Diego, CA (US); Arun Prasanth Balasubramanian, San Diego, CA (US); Vaishakh Rao, San Diego, CA (US); Leena Zacharias, San Jose, CA (US); Vanitha Aravamudhan Kumar, San Diego, CA (US); Shailesh Maheshwari, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/059,169

(22) Filed: Nov. 28, 2022

(65) Prior Publication Data

US 2023/0090373 A1 Mar. 23, 2023

Related U.S. Application Data

(63) Continuation of application No. 17/217,986, filed on Mar. 30, 2021, now abandoned.
(Continued)

(51) Int. Cl.
*H04W 28/00* (2009.01)
*G06N 20/00* (2019.01)
(Continued)

(52) U.S. Cl.
CPC ............. *H04L 47/28* (2013.01); *G06N 20/00* (2019.01); *H04W 28/06* (2013.01)

(58) Field of Classification Search
CPC .... G06N 20/00; G06N 3/0445; G06N 3/0454; G06N 3/084; H04L 12/24; H04L 12/841;
(Continued)

(56) References Cited

U.S. PATENT DOCUMENTS 10,575,213 B2 * 2/2020 Jo .................... H04W 88/16
10,893,437 B2   1/2021 Wang et al.
(Continued)

FOREIGN PATENT DOCUMENTS

WO    2019216975 A1    11/2019
WO    2019245181 A1    12/2019

OTHER PUBLICATIONS

International Search Report and Written Opinion—PCT/US2021/025188—ISA/EPO—Aug. 4, 2021.
(Continued)

*Primary Examiner* — Frank Duong
(74) *Attorney, Agent, or Firm* — Patterson & Sheridan, LLP

(57) ABSTRACT

Certain aspects of the present disclosure provide techniques for packet buffering. A method that may be performed by a receiving node includes dynamically determining one or more time durations to buffer packets. The one or more time durations can be different than a time duration of a configured timer for buffering the packets. The receiving node may input one or more parameters to a machine learning algorithm and obtain, as output of the machine learning algorithm based on the input one or more parameters, one or more time durations to buffer packets. The receiving node buffers packets for the determined one or more time durations. The receiving node may use machine learning to dynamically determine the one or more time durations to
(Continued)

buffer packet. The buffering may be at a radio link control (RLC) reassembling buffer and/or a packet data convergence protocol (PDCP) buffer.

19 Claims, 13 Drawing Sheets

Related U.S. Application Data

(60) Provisional application No. 63/003,587, filed on Apr. 1, 2020.

(51) Int. Cl.
 *H04L 47/28* (2022.01)
 *H04W 28/06* (2009.01)
(58) Field of Classification Search
 CPC ..... H04L 41/145; H04L 41/147; H04L 41/16; H04L 41/5009; H04L 47/193; H04L 47/28; H04L 47/30; H04L 47/624; H04L 49/90; H04W 28/0205; H04W 28/04; H04W 28/06; H04W 28/0908; H04W 28/14; H04W 76/16; H04W 88/06
 See application file for complete search history.

(56) References Cited

U.S. PATENT DOCUMENTS

| | | |
|---|---|---|
| 2009/0201818 A1 | 8/2009 | Patwardhan et al. |
| 2016/0044639 A1 | 2/2016 | Yi et al. |
| 2017/0093648 A1 | 3/2017 | Eiarabawy et al. |
| 2018/0098241 A1* | 4/2018 | Callard ................. H04W 92/10 |
| 2018/0317236 A1* | 11/2018 | Yang ....................... H04L 47/28 |
| 2019/0104076 A1 | 4/2019 | Seetharaman et al. |
| 2019/0140911 A1 | 5/2019 | Jain et al. |
| 2019/0159082 A1 | 5/2019 | Talebi Fard et al. |
| 2020/0022212 A1* | 1/2020 | Eda ....................... H04L 1/1832 |
| 2020/0351214 A1* | 11/2020 | Jung ..................... H04W 28/06 |
| 2021/0105517 A1 | 4/2021 | Cho et al. |
| 2021/0143883 A1 | 5/2021 | Yerramalli et al. |
| 2021/0243632 A1 | 8/2021 | Pezeshki et al. |
| 2021/0258409 A1 | 8/2021 | Kanamarlapudi et al. |
| 2021/0266210 A1 | 8/2021 | Namgoong et al. |
| 2021/0314270 A1 | 10/2021 | Dalmiya et al. |
| 2022/0014960 A1* | 1/2022 | Lee ......................... H04L 5/001 |
| 2022/0070736 A1 | 3/2022 | Nazari et al. |

OTHER PUBLICATIONS

Partial International Search Report—PCT/US2021/025188—ISA/EPO—Jul. 1, 2021.

\* cited by examiner

DYNAMIC PACKET BUFFERING DURATION

CROSS-REFERENCE TO RELATED APPLICATION(S)

This application is a continuation application of U.S. application Ser. No. 17/217,986, filed Mar. 30, 2021, which claims benefit of and priority to U.S. Provisional Application No. 63/003,587, filed Apr. 1, 2020, which are hereby assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for packet buffering.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Some features will now be discussed briefly. After considering this discussion, and particularly after reading the section entitled "Detailed Description" one will understand how the features of this disclosure provide advantages that include improved packet buffering at a receiver.

Certain aspects of the subject matter described in this disclosure can be implemented in an apparatus for wireless communication. The apparatus generally includes at least one processor and a memory coupled with the at least one processor. The processor and the memory are configured to input one or more parameters to a machine learning algorithm. The processor and the memory are configured to obtain, as output of the machine learning algorithm based at least in part on the input one or more parameters, one or more time durations to buffer packets. The one or more time durations are different than a time duration of a configured timer for buffering the packets. The processor and the memory are configured to buffer the packets for one of the one or more time durations.

Certain aspects of the subject matter described in this disclosure can be implemented in a method for wireless communication by a node. The method generally includes inputting one or more parameters to a machine learning algorithm. The method includes obtaining, as output of the machine learning algorithm based at least in part on the input one or more parameters, one or more time durations to buffer packet. The one or more time durations are different than a time duration of a configured timer for buffering the packets. The method includes buffering the packets for one of the one or more time durations.

Certain aspects of the subject matter described in this disclosure can be implemented in an apparatus for wireless communication. The apparatus generally includes means for inputting one or more parameters to a machine learning algorithm. The apparatus generally includes means for obtaining, as output of the machine learning algorithm based at least in part on the input one or more parameters, one or more time durations to buffer packets. The one or more time durations are different than a time duration of a configured timer for buffering the packets. The apparatus generally includes means for buffering the packets for one of the one or more time durations.

Certain aspects of the subject matter described in this disclosure can be implemented in a computer readable medium storing computer executable code thereon for wireless communication. The computer readable medium generally includes code for inputting one or more parameters to a machine learning algorithm. The computer readable medium generally includes codes for obtaining, as output of the machine learning algorithm based at least in part on the input one or more parameters, one or more time durations to buffer packets. The one or more time durations are different than a time duration of a configured timer for buffering the packets. The computer readable medium generally includes code for buffering the packets for one of the one or more time durations.

Certain aspects of the subject matter described in this disclosure can be implemented in a method for wireless communication by a receiving node. The method generally includes dynamically determining one or more time durations to buffer packets. The one or more time durations are different than a time duration of a configured timer for buffering the packets. The method generally includes buffering packets for the determined one or more time durations.

Certain aspects of the subject matter described in this disclosure can be implemented in an apparatus for wireless communication. The apparatus generally includes at least one processor and a memory coupled with the at least one processor. The processor and the memory configured to dynamically determine one or more time durations to buffer packets. The one or more time durations are different than a time duration of a configured timer for buffering the packets.

The processor and the memory may be configured to buffer packets for the determined one or more time durations.

Certain aspects of the subject matter described in this disclosure can be implemented in an apparatus for wireless communication. The apparatus generally includes means for dynamically determining one or more time durations to buffer packets. The one or more time durations are different than a time duration of a configured timer for buffering the packets. The apparatus generally includes means for buffering packets for the determined one or more time durations.

Certain aspects of the subject matter described in this disclosure can be implemented in a computer readable medium storing computer executable code thereon for wireless communication. The computer readable medium generally includes code for dynamically determining one or more time durations to buffer packets. The one or more time durations are different than a time duration of a configured timer for buffering the packets. The computer readable medium generally includes buffering packets for the determined one or more time durations.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
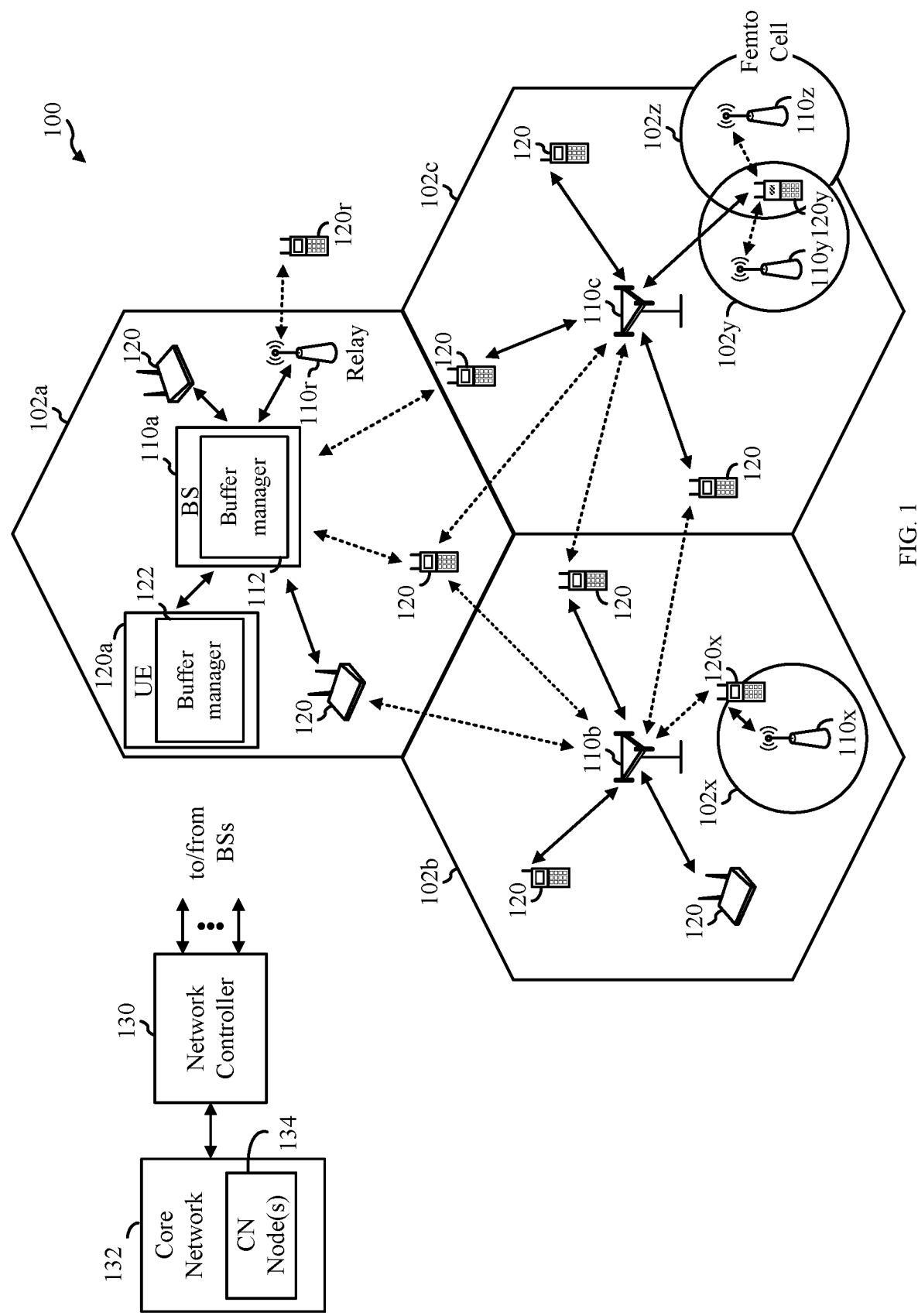
FIG. 1 is a block diagram conceptually illustrating an example wireless communication network, in accordance with certain aspects of the present disclosure.

Aspects of the present disclosure provide apparatus, methods, processing systems, and computer readable mediums for packet buffering.

In certain systems, a receiving node buffers received packets. For example, packet buffering can be used for hybrid automatic repeat request (HARQ) systems and/or for handling out-of-order packets. For example, in some cases, packets may not be received in the correct order (e.g., the packet sequence numbers (SNs) of a transmission, such as a transport block (TB) may not be received sequentially) and/or some packets may not be received, may not be successfully decoded, and/or may not be successfully processed. Some examples of packet buffers, are the packet data convergence protocol (PDCP) reordering buffer and the radio link control (RLC) reassembling buffer.

According to one or more examples, the receiving node may be configured with a timer or duration for buffering packets. The timer may allow a duration for buffering packets during which missing packets can be retransmitted by a transmitting node and received at the receiving node. The receiving node may be configured to wait for expiry of the timer before taking further actions. For example, the receiving node may wait for expiry of the timer before sending the received, and buffered, packets to upper layers and/or before sending a negative acknowledgment to the transmitting node of missing packets.

Aspects of the present disclosure provide for dynamically determining a duration to buffer packets. In some examples, the receiving node can dynamically determine a duration to buffer packets instead of following a configured timer duration or overriding a configured timer duration. In some examples, the dynamically determined duration may allow the receiving node to early flush the buffer (e.g., earlier than a configured timer duration) and send packets to upper layers and/or send a negative acknowledgment to the transmitting node of missing packets. In some examples, the receiving node dynamically determines the duration to buffer packets based on information related past history of buffering, likelihood of receiving the missing packets, configuration parameters, and the like. In some examples, the receiving node may use machine learning to dynamically determine the duration to buffer packets. For example, the information/parameters can be used as input to a machine learning algorithm to output a duration to buffer packets. The receiving node may input historical values associated with the one or more parameters to the machine learning algorithm. The one or more parameters may include one or more lower layer block error rates (BLERs), one or more numbers of hybrid automatic repeat request (HARQ) retransmissions used to determine a HARQ delay, one or more numbers of radio link control (RLC) retransmissions used to determine an RLC delay, and/or one or more dual connectivity configurations of the apparatus. Buffering packets for the dynamically determined duration can provide low overhead and low end-to-end latency.

The following description provides examples of dynamically determining a duration to buffer packets in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, wireless communication network 100 may be an NR system (e.g., a 5G NR network). As shown in FIG. 1, wireless communication network 100 may be in communication with a core network 132. Core network 132 may in communication with one or more base station (BSs) 110 and/or user equipment (UE) 120 in wireless communication network 100 via one or more interfaces.

As illustrated in FIG. 1, wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for femto cells 102y and 102z, respectively. A BS 110 may support one or multiple cells. A network controller 130 may couple to a set of BSs 110 and provide coordination and control for these BSs 110 (e.g., via a backhaul).

BSs 110 communicate with UEs 120a-y (each also individually referred to herein as UE 120 or collectively as UEs 120) in the wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., BS 110a or a UE 120r) and sends a transmission of the data and/or other information to a downstream station (e.g., UE 120 or BS 110), or that relays transmissions between UEs 120, to facilitate communication between devices.

According to certain aspects, BSs 110 and UEs 120 may be configured for packet buffering. As shown in FIG. 1, BS 110a includes a buffer manager 112. As shown in FIG. 1, UE 120a includes a buffer manager 122. Buffer manager 112 and/or buffer manager 122 may be configured for dynamically determining a duration to buffer packets, in accordance with aspects of the present disclosure. Buffer manager 112 and/or buffer manager 122 may be configured to input one or more parameters and to obtain, as output from the machine learning algorithm based on the input, one or more time durations for buffering packets.

Figure 2:
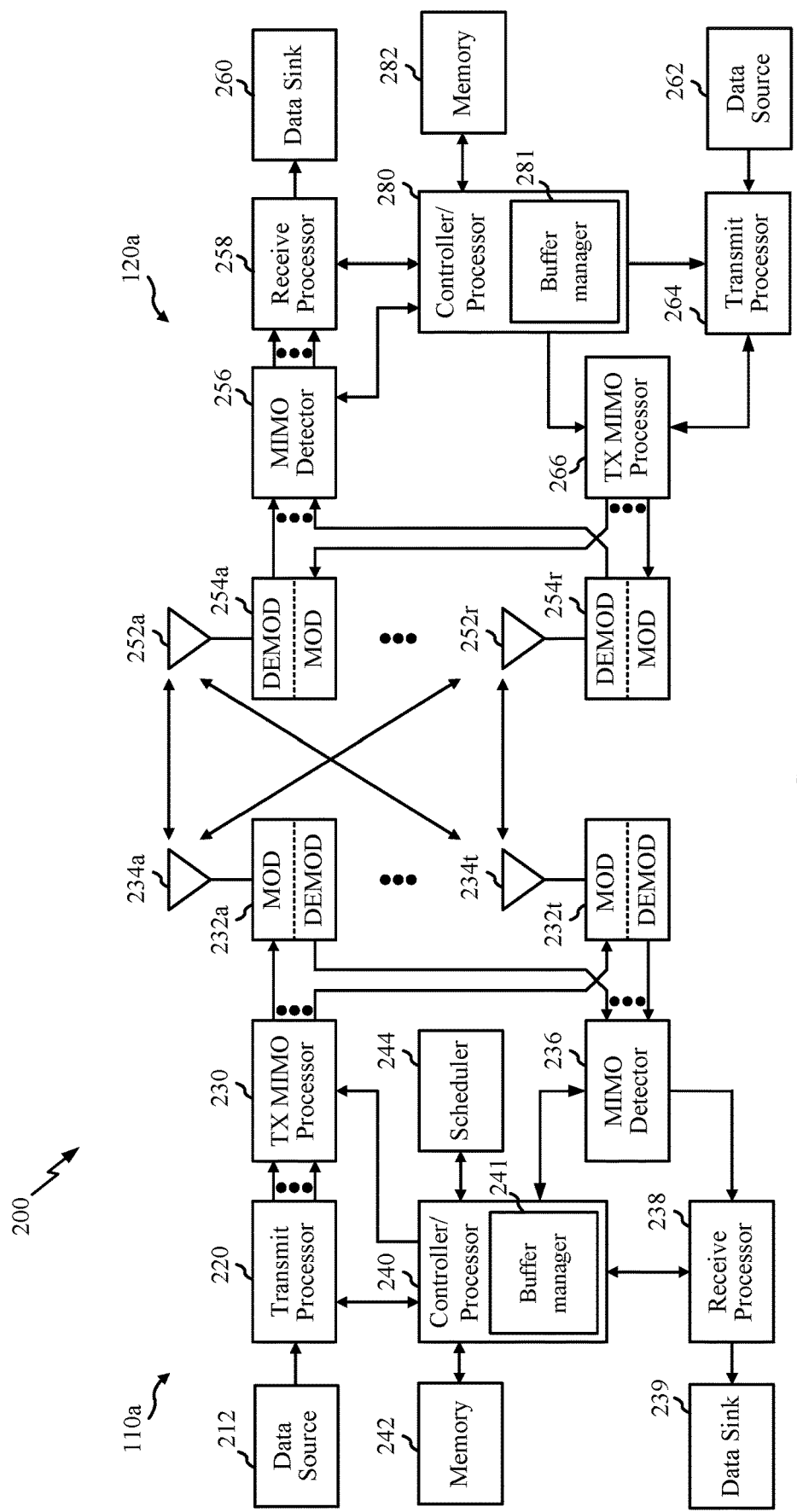
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceiver(s) 232a-232t. Each modulator in transceiver(s) 232a-232t may process a respective output symbol stream (e.g., for OFDM, etc.) to obtain an output sample stream. Each modulator in transceivers 232a-232t may further process (e.g., convert to analog, amplify, filter, and upconvert) the output sample stream to obtain a downlink signal. Downlink signals from modulators in transceiver 232a-232t may be transmitted via the antennas 234a-234t, respectively.

At the 120a, antennas 252a-252r may receive the downlink signals from BS 110a and may provide received signals to the demodulators (DEMODs) in transceivers 254a-254r, respectively. Each demodulator in transceiver(s) 254a-254r may condition (e.g., filter, amplify, downconvert, and digitize) a respective received signal to obtain input samples. Each demodulator in transceiver(s) 254a-254r may further process the input samples (e.g., for OFDM, etc.) to obtain received symbols. A MIMO detector 256 may obtain received symbols from all the demodulators in transceiver(s) 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110a. At BS 110a, the uplink signals from UE 120a may be received by antennas 234, processed by the demodulators in transceiver(s) 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of the BS 110a has a buffer manager 241 and controller/processor 280 of the UE 120a has a buffer manager 281. Buffer manager 241 and/or buffer manager 281 may be configured for dynamically determining a duration to buffer packets, according to aspects described herein. Although shown at the controller/processor, other components of UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
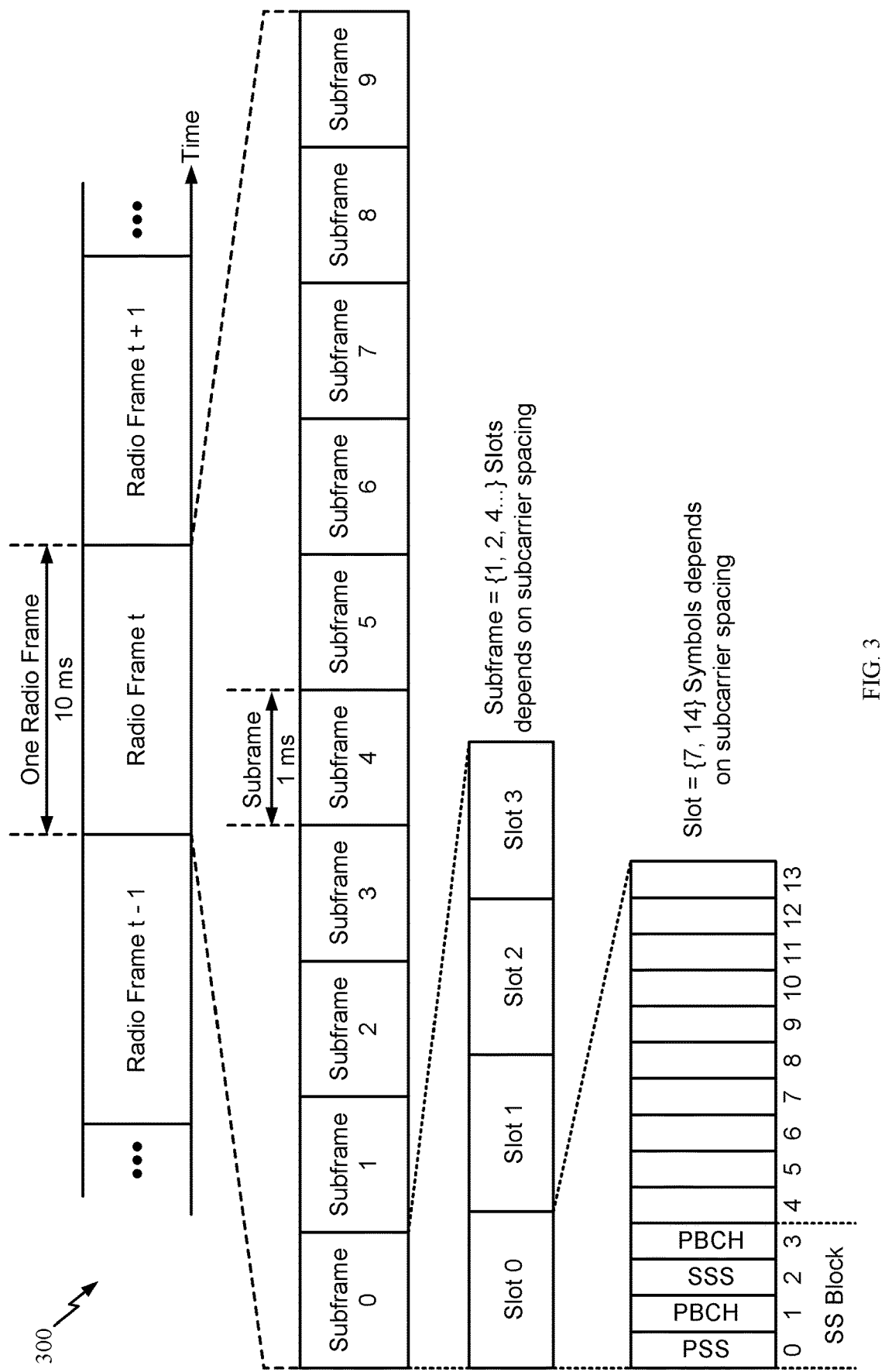
FIG. 3 is an example frame format for communication in a wireless communication network, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A sub-slot structure has a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some systems, a UE may provide dual connectivity (DC) to two or more nodes. In some examples, a UE may provide DC to nodes of the same type of RAT, such as between to NR nodes. In some examples, a UE may provide DC to nodes of different RATs. One dual connectivity configuration is E-UTRAN-NR dual connectivity (EN-DC), which can provide dual connectivity between an Evolved Universal Mobile Telecommunications System (UMTS) Terrestrial Radio Access network (E-UTRAN), such as 4G/LTE, and a NR network, such as 5G/NR. For example, the 4G/LTE network can provide a fallback option when 5G/NR coverage is not adequate or when some services (e.g., Voice over Internet Protocol (VoIP), such as Voice over LTE (VoLTE), and/or other services) are not deployed on the 5G/NR network.

Figure 4:
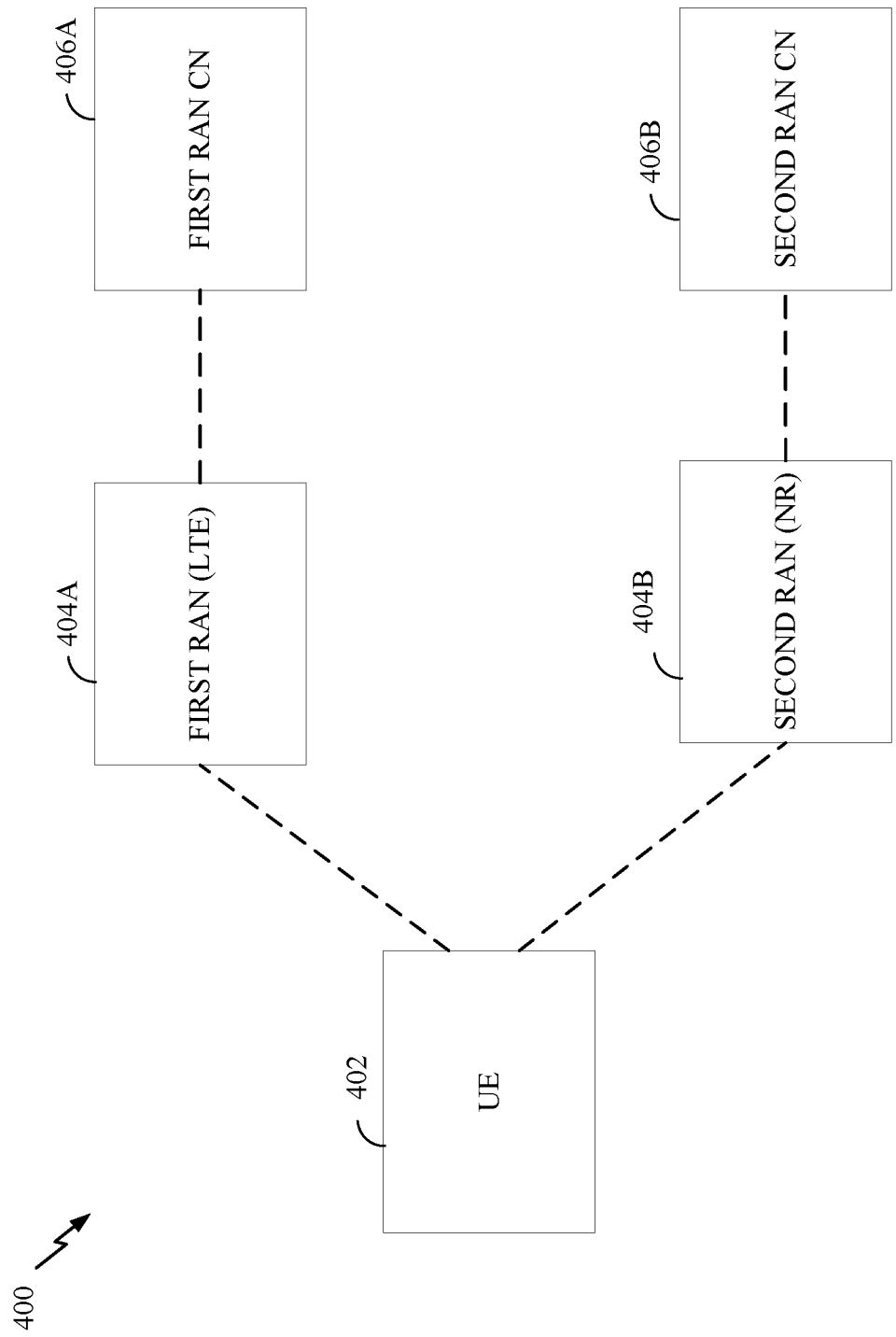
FIG. 4 illustrates an example system architecture for interworking between a 5G System (5GS) and an evolved universal mobile telecommunication system network (E-UTRAN) system, in accordance with certain aspects of the present disclosure.

FIG. 4 illustrates an example system architecture 400 for interworking between a 5G system (5GS) and E-UTRAN-EPC (evolved packet core), in accordance with certain aspects of the present disclosure. As shown in FIG. 4, a UE 402 may be served by separate RANs 404A and 404B controlled by separate core networks 406A and 406B, where a first RAN 404A and CN 406A may provide E-UTRA services and a second RAN 404B and CN 406B may provide 5G NR services. The UE may operate under only one RAN/CN or both RANs/CNs at a time.

For a UE performing EN-DC, data can be received on both a 4G/LTE connection and a 5G/NR leg (e.g., on a secondary cell group split bearer). Data speed and latency can be significantly different for 4G/LTE and 5G/NR. For example, in scenarios where the 4G/LTE connection experiences bad radio frequency conditions and performs hybrid automatic repeat request (HARM) and/or radio link control (RLC) retransmissions, the 5G/NR connection can continue to receive data at a higher rate than the 4G/LTE connection. This can cause a large number of out-of-order packets at the UE.

As will be described in more detail with reference to FIG. 5, logical functions may distributed at a Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layer. In various examples, the layers of the protocol stack 500 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. A system may support various services over one or more protocols.

One or more protocol layers of a protocol stack 500 may be implemented by a receiving node, such as a UE and/or a BS (e.g., an LTE eNB, a 5G NR access node (AN) or gNB). A UE may implement the entire protocol stack 500 (e.g., an RRC layer 505, a PDCP layer 510, an RLC layer 515, a MAC layer 520, PHY layer(s) 525, and RF layer(s) 530). Protocol stack 500 may be split in an AN. For example, a central unit control plane (CU-CP) and a CU user plane (CU-UP) each may implement RRC layer 505 and PDCP layer 510; a distributed unit (DU) may implement RLC layer 515 and MAC layer 520; and an access unit (AU)/remote radio unit (RRU) may implement PHY layer(s) 525 and RF layer(s) 530.

As mentioned above, packet buffering can be used for handling out-of-order and/or missed packets. As shown in FIG. 5, PDCP layer 510 may include a reordering buffer manager 512 and RLC layer 515 may include reassembly buffer manager 517.

The receiving node may have a configured timer for packet buffering. In some systems, the PDCP reordering buffer is configured with a reordering timer and the RLC reassembly buffer is configured with a reassembly timer. The timer may provide a duration in which missing packets can be retransmitted by the transmitter and/or enough time for out-of-order packets to reach the receiver side.

In NR, the PDCP receiving entity maintains a PDCP reordering timer (e.g., that may be referred to as the t-reordering timer). Any arrival of an out-of-order PDU may trigger the reordering timer when the timer is not already running. The receiving entity delivers received packets to upper layers (e.g., such as MAC layer 520, PHY layer 525, and/or RF layer 530) only after the reordering timer expired. The PDCP receiving entity holds (e.g., buffers) received packets for extra time even when packets are known to be lost. In, LTE, the reordering timer may be maintained at the RLC.

The receiving node may be configured to: when a PDCP Data PDU is received from lower layers, and if the received PDCP Data PDU with COUNT value=RCVD_COUNT is not discarded already, the receiving PDCP entity stores the resulting PDCP service data unit (SDU) in the reception buffer. And when a t-Reordering expires, the receiving PDCP entity delivers to upper layers in ascending order of the associated COUNT value after performing header decompression.

The reordering timer can be configured based on a value large enough to accommodate HARQ retransmission and RLC retransmission delays. To maintain a low target packet loss rate (PLR), this value can be on the order of hundreds of milliseconds. In some cases (e.g., when data is flowing at a high speed, such as on a 5G/NR connection), the PDCP buffer could become congested or full before the reordering timer triggers provision of the buffered data to the upper layer. When the PDCP reordering buffer is full, subsequent packets received from lower layers can be dropped. This can be particularly problematic when high-speed traffic, such as 5G/NR traffic, is dropped, as a significant amount of data can be lost.

For the RLC reassembly buffer, the RLC receiving entity maintains an RLC reassembly timer. Any arrival of an out-of-order RLC PDU triggers the timer when the timer is not running. Once the reassembly timer expires, the RLC receiving entity sends the RLC control PDU to the transmitter to indicate missing PDUs so that those PDUs can be retransmitted. The RLC receiving entity may not send the control PDU to the RLC transmitting entity before the reassembly timer expires, even when the packets are known to be lost.

The receiving side of an acknowledge mode (AM) RLC entity may maintain a receiving window according to a state variable RX_Next. A SN falls within the receiving window if RX_Next≤SN<RX_Next+AM_Window_Size. A SN falls outside of the receiving window otherwise. When receiving an AMD PDU from a lower layer, the receiving side of an AM RLC entity discards the received AMD PDU or places it in the reception buffer.

In some examples, the transmitting entity skips packets (e.g., PDCP SN(s)) due to the losses in the core NW side. For example, the losses in the core NW side may occur in the F1-U interface between the central unit control plane (CU-CP) and the CU user plane (CU-UP) and the DU. Such loss in PDCP SN(s) may not be recovered by the RLC because the RLC SNs may be continuous. In this case, the UE receiving entity waits for the packets for the full reordering timer duration thereby affecting the overall latency of the packets and also leading to quick buildup of reordering buffer memory.

In EN-DC, the latency between the LTE link and the NR link are different. PDCP PDUs from NR link likely to reach the receiving node earlier than PDCP PDUs over the LTE link. This results in large number of PDCP PDUs being accumulated in the receiver's reordering buffer waiting for reordering.

Figure 5:
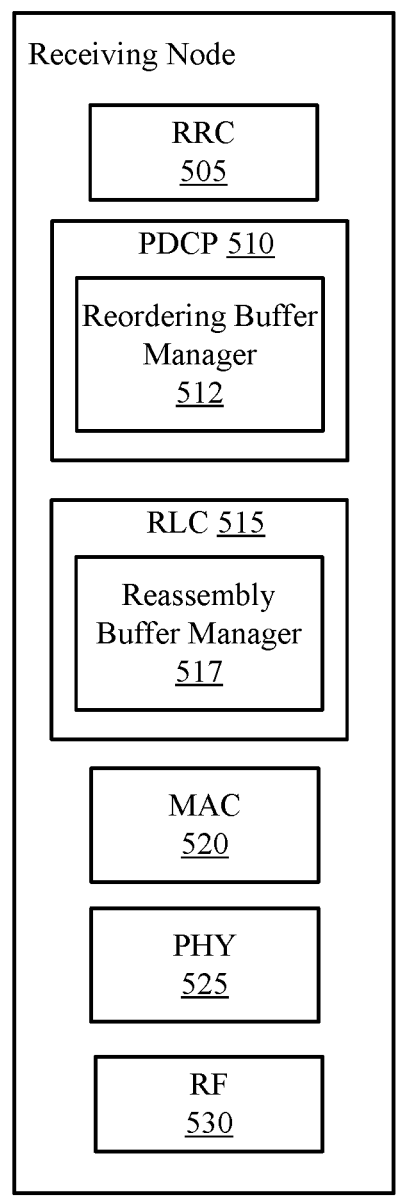
FIG. 5 is a block diagram showing examples for implementing a communication protocol stack, in accordance with certain aspects of the present disclosure.
Figure 6:
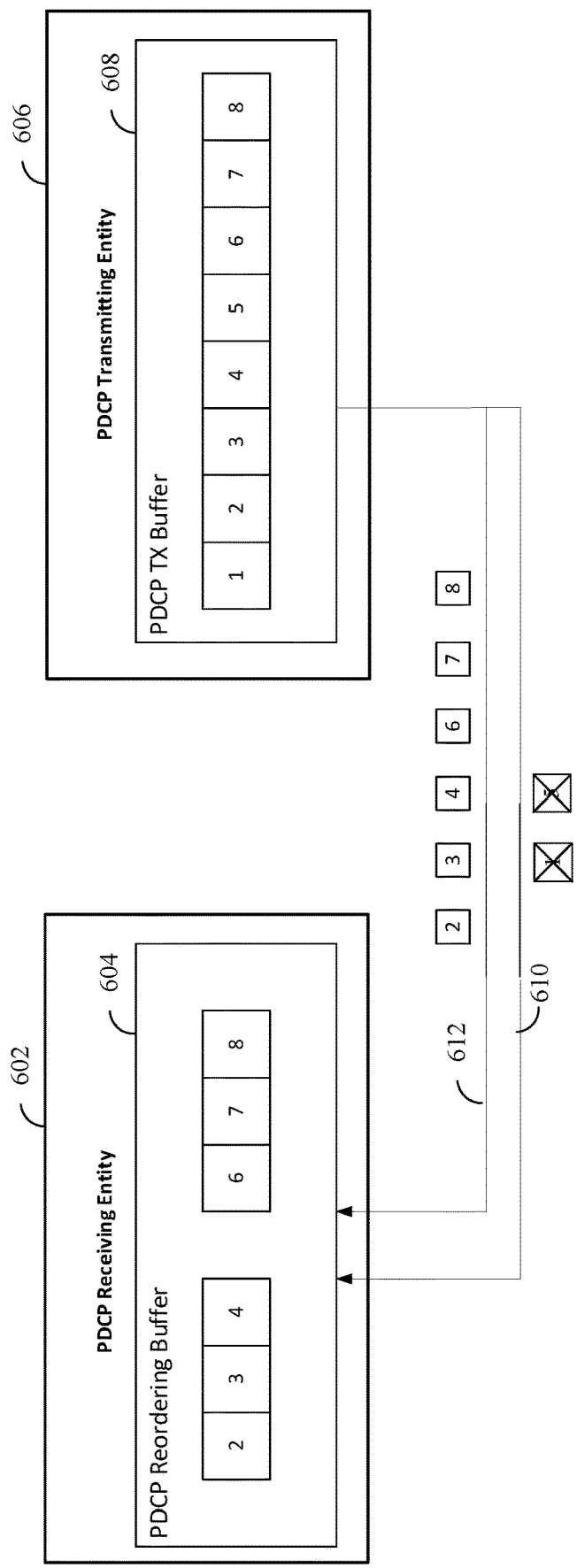
FIG. 6 illustrates example packet data convergence protocol (PDCP) reordering buffers, in accordance with aspects of the present disclosure.

In an example shown in FIG. 6, a PDCP transmitting entity 606 sends PDUs indexed 1-8 in a PDCP transmit buffer 608 to a PDCP receiving entity 602 (e.g., such as receiving node 500 in FIG. 5). PDU 1 and PDU 5 are sent over an LTE link 610 and the PDUs 2-4 and 6-8 are sent over an NR link 612. In the example in FIG. 6, the PDUs 1 and 5 over the LTE link 610 are lost over the air (e.g., due to physical BLER in LTE link 610), while the PDUs 2-4 and 6-8 over NR link 612 reach PDCP receiving entity 602 successfully. The PDU 2-4 and 6-8 and all later PDUs, therefore, are cached in PDPC receiving entity's PDCP reordering buffer 604 until the PDCP reordering timer expires. Thus, PDCP reordering buffer 604 consumes a large amount of memory unnecessarily because the PDUs 1 and 5 may never reach PDCP receiving entity 602.

In some 5G NR systems, the sequence number length may be large. For example, some 5G NR systems may use a sequence number of up to 18 bits (e.g., as compared to 12 bits in the 4G/LTE PDCP). While this can help to reorder data packets, it also means that large reordering buffers may be used (e.g., up to around 1.17 gigabytes of PDCP buffer for each radio bearer). As a result, EN-DC UEs can experience buffer congestion and buffer overflow at the PDCP layer, impacting upper layer performance and leading to poor user perception, for example, due to transport control protocol (TCP) timeout and data stall.

Figure 7:
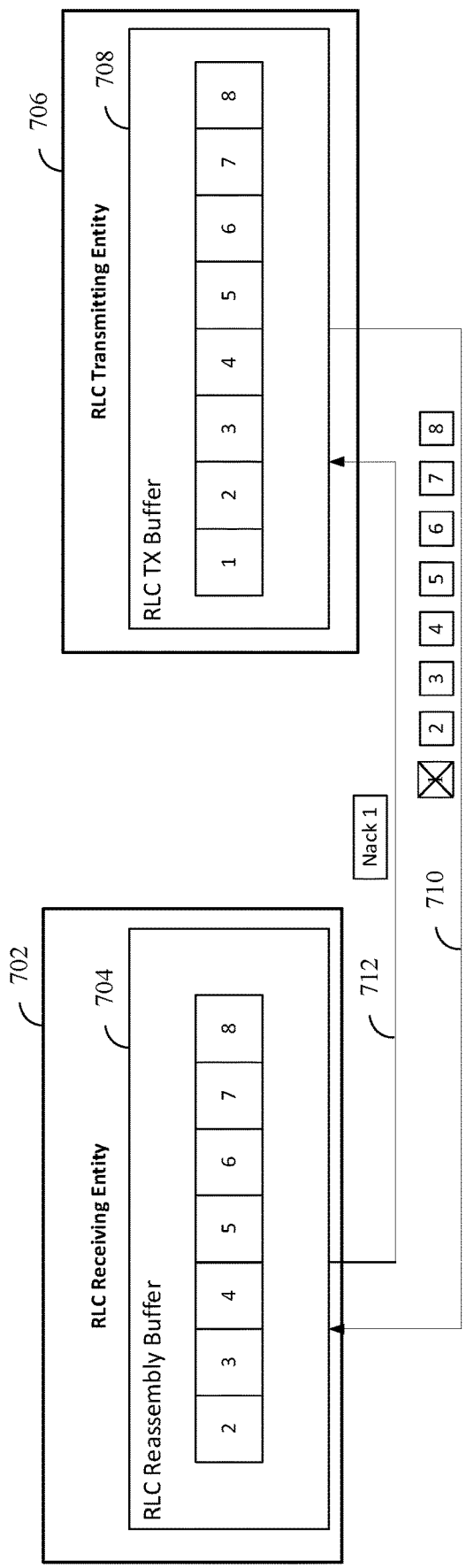
FIG. 7 illustrates example radio link control (RLC) reassembly buffers, in accordance with aspects of the present disclosure.

In an example shown in FIG. 7, a RLC transmitting entity 706 sends PDUs indexed 1-8 in an RLC transmit buffer 708 to a RLC receiving entity 702 (e.g., such as receiving node 500 in FIG. 5). In the example shown in FIG. 7, the PDU 1 is lost over the air while PDU 2-8 are successfully transmitted to RLC receiving entity 702. An RLC reassembly timer is started for an RLC reassembly buffer 704 because the PDU 1 is missing. Once the reassembly timer expires, RLC receiving entity 702 sends an RLC control PDU (e.g., NACK 1) to RLC transmitting entity 706 indicating the PDU 1 is missing (e.g., NACK 1). The PDU 2-8 are cached at RLC reassembly buffer 704 during the reassembly window until the PDU 1 is retransmitted by RLC transmitting entity 706. The longer the reassembly timer used by RLC receiving entity 702, the greater the number of PDUs that may be cached at the RLC reassembly buffer 704. The shorter the reassembly timer used by RLC receiving entity 702, the greater the number of duplicate RLC control PDUs that may be sent and the greater the number of duplicate retransmissions triggered by RLC transmitting entity 706. Thus, memory overhead on RLC receiving entity 702 is incurred and end-to-end latency on received packets may be longer. It is difficult for one value of configured timer to adjust to different physical layer conditions.

Example Dynamic Packet Buffering Duration

According to certain aspects, a duration for packet buffering can be dynamically determined. In some examples, a receiving node (e.g., user equipment (UE) on the downlink or a base station (BS) on the uplink) can dynamically determine a duration for buffering packets. In some examples, the dynamically determined duration may be performed instead of being configured with a fixed timer duration. In some examples, the dynamically determined duration can be used to replace or update a configured timer duration. In some examples, the dynamically determined duration can be different than a configured timer duration. For example, the dynamically determined duration may be used to early exit a buffering duration. In some examples, based on the dynamically determined duration the receiving node can perform an early flush of a buffer (e.g., in a receiver window), deliver packets to upper layers, and/or send an acknowledgment, negative ACK (NACK) or request for a retransmission. In some examples, the receiving node uses machine learning (ML) to dynamically determine the buffering duration. The receiving node may input one or more parameters to a ML algorithm and obtain, as output of the ML algorithm, one or more durations for buffering packets. In some examples, the buffering can be at the radio link control (RLC) layer and/or at the packet data convergence protocol (PDCP) layer.

According to certain aspects, the receiving node can determine an optimized duration to buffer packets. In some examples, the receiving node can predict whether a missing packet (e.g., a protocol data unit (PDU)) can be received before a configured timer expires, predict a likelihood of the missing packet being received before a configured timer expires, predict a duration in which the missing packet can be received, and/or predict a plurality of likelihoods for a plurality of durations in which the missing packet can be received. Based on the prediction(s), the receiving node can dynamically determine an appropriate duration to buffer packets. For examples, the receiving node may select a duration to buffer packets based on the likelihood of the durations in which the missing packet may be received, and may take into account a buffer size, channel congestion, latency tolerance, in dynamically selecting the duration to buffer packets. In some examples, when the receiving node predicts that a missing PDU will not be received (e.g., or is unlikely to be received) within a configured reordering timer duration or rearranging time duration, then the receiving node may determine to buffer packets for a shorter duration than the configured reordering timer duration or rearranging time duration. This may avoid or mitigate memory consumption and end-to-end latency. The receiving node may determine a duration to set for a buffering timer or a time to halt buffering and flush packets.

As mentioned above, the receiving node may use machine learning for determining the duration to buffer packets. In some examples, the receiving node may use a ML algorithm to form the prediction(s) discussed above and/or for selecting the duration to buffer packets based on the prediction(s).

Machine learning may involve training a model by the receiving node, such as a predictive model. The model may be used to predict a feasible duration a missing packet may be received. The model may be used to perform the prediction(s) discussed above and/or other factors. The model may be used to select an appropriate duration to buffer packets. The selection may be based on factors discussed above and/or other factors. The model may be trained based on training data (e.g., training information), which may include feedback, such as feedback associated buffering history, history of receiving missing packets, capabilities of the receiving node, channel characteristics, and/or other feedback. Training may involve feedback in response to any the predictions by the ML algorithm discussed herein or other predictions based on any of the input parameters discussed herein or other input parameters.

Figure 8:
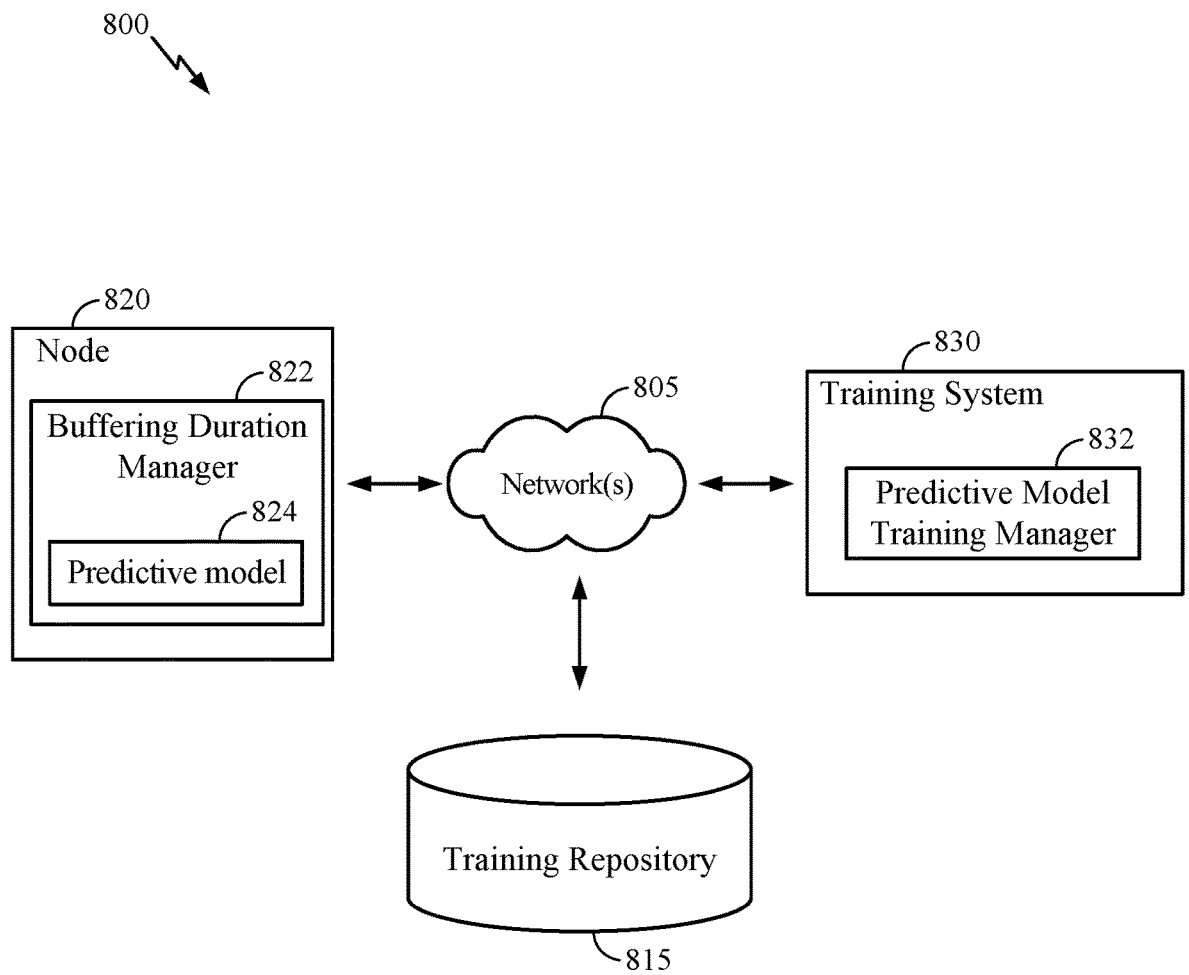
FIG. 8 illustrates an example networked environment in which a predictive model is used for channel estimates, according with certain aspects of the present disclosure.

FIG. 8 illustrates an example networked environment 800 in which a packet buffering duration manager 822 of a node 820 uses a predictive model 824 for dynamic determination of a packet buffering duration, according to certain aspects of the present disclosure. As shown in FIG. 8, networked environment 800 includes node 820, a training system 830, and a training repository 815, communicatively connected via network(s) 805. Node 820 may be a UE (e.g., such as the UE 120a in the wireless communication network 100) or a BS (e.g., such as the BS 110a in the wireless communication network 100). Network(s) 805 may include a wireless network such as wireless communication network 100, which may be a 5G NR network, a WiFi network, an LTE network, and/or another type of network. While training system 830, node 820, and training repository 815 are illustrated as separate components in FIG. 8, training system 830, node 820, and training repository 815 may be implemented on any number of computing systems, either as one or more standalone systems or in a distributed environment.

Training system 830 generally includes a predictive model training manager 832 that uses training data to generate predictive model 824 for predicting a packet buffering duration. Predictive model 824 may be generated based, at least in part, on the information in training repository 815.

Training repository 815 may include training data obtained before and/or after deployment of node 820. Node 820 may be trained in a simulated communication environment (e.g., in field testing, drive testing) prior to deployment of node 820. For example, various buffer history information can be stored to obtain training information related to the estimates, predictions, etc.

This information can be stored in training repository 815. After deployment, training repository 815 can be updated to include feedback associated with packet buffering durations used by node 820. The training repository can also be updated with information from other BSs and/or other UEs, for example, based on learned experience by those BSs and UEs, which may be associated with packet buffering performed by those BSs and/or UEs.

Predictive model training manager 832 may use the information in training repository 815 to determine predictive model 824 (e.g., algorithm) used for dynamic packet buffering duration. Predictive model training manager 832 may use various different types of machine learning algorithms to form predictive model 824. Training system 830 may be located on node 820, on a BS in the network 805, or on a different entity that determines predictive model 824. If located on a different entity, then predictive model 824 is provided to node 820. Training repository 815 may be a storage device, such as a memory. Training repository 815 may be located on node 820, training system 830, or another entity in network 805. Training repository 815 may be in cloud storage. Training repository 815 may receive training information from node 820, entities in network 805 (e.g., BSs or UEs in network 805), the cloud, or other sources.

The machine learning may use any appropriate machine learning algorithm. In some non-limiting examples, the machine learning algorithm is a supervised learning algorithm, a deep learning algorithm, an artificial neural network algorithm, or other type of machine learning algorithm.

In some examples, the machine learning (e.g., used by training system 830) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system 830) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by training system 830), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, training system 830 generates vectors from the information in training repository 815. In some examples, training repository 815 stores vectors. In some examples, the vectors map one or more features to a label. For example, the features may correspond to various candidate durations, buffering capabilities, and/or other factors discussed above. The label may correspond to the predicted likelihoods of receiving a missing packet and/or selected packet buffering duration(s). Predictive model training manager 832 may use the vectors to train predictive model 824 for node 820. As discussed above, the vectors may be associated with weights in the machine learning algorithm.

Figure 9:
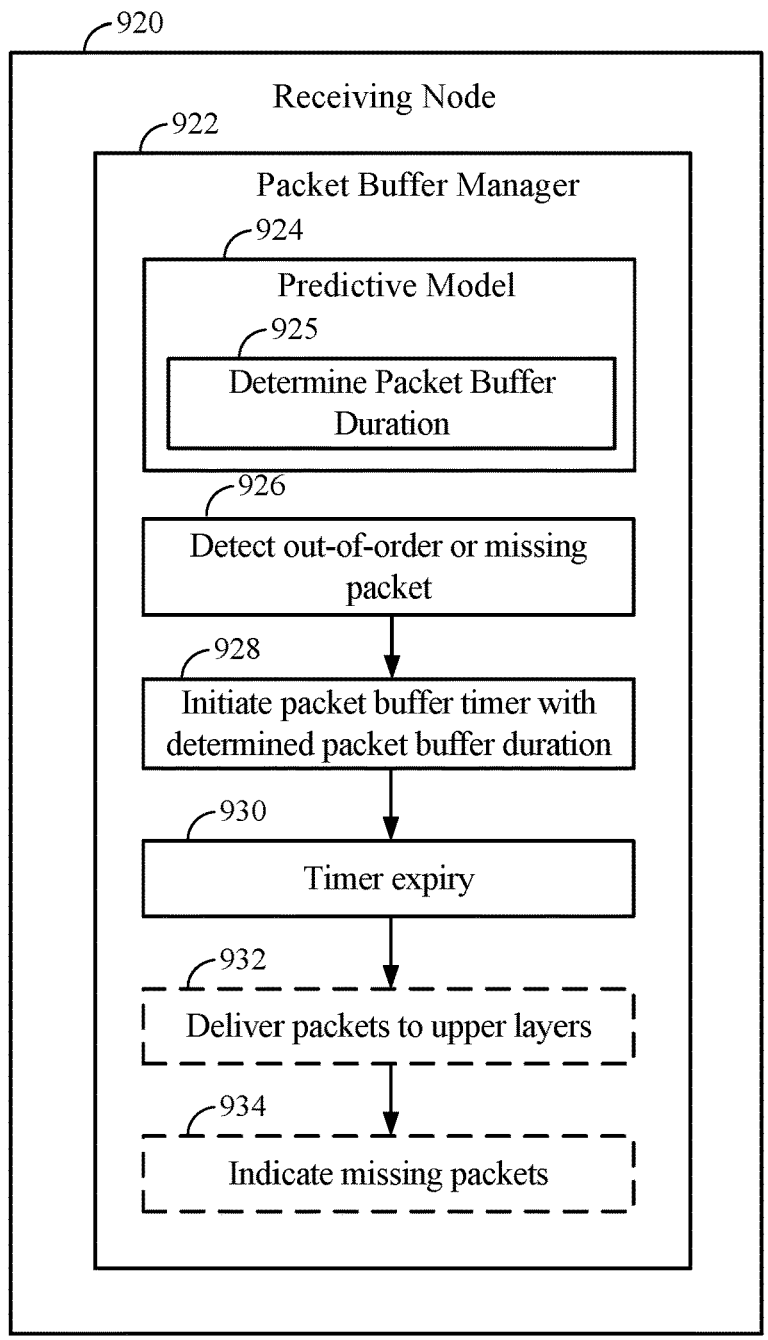
FIG. 9 illustrates an example node in a networked environment in which a predictive model is used for buffering duration determination, according with certain aspects of the present disclosure.

As shown in FIG. 9, a receiving node 920 (e.g., such as the node 820 in the networked environment 800 shown in FIG. 8) may include a packet buffer manager 922. Packet buffer manager 922 may be configured to dynamically determine a duration to buffer packets. Packet buffer manager 922 may be included at a PDCP layer (e.g., such as at reordering buffer manager 512 at PDCP layer 510 shown in FIG. 5) and/or at RLC layer (e.g., such as at reassembly buffer manager 517 at RLC layer 515 shown in FIG. 5)

Packet buffer manager 922 may include a predictive model 924 (e.g., such as predictive model 824 that can be trained). Predictive model 924 may determine a packet buffer duration 925. For example, predictive model 924 may use the ML algorithm to dynamically determine packet buffer duration 925.

Predictive model 924 may predict a duration to buffer packets such that receiving node 920 waits enough time for out-of-order PDUs to arrive while avoiding accumulating too many unnecessary PDUs in the packet buffer. For example, as discussed above, predictive model 924 may take into account information related to the timer for out-of-order PDUs to arrive, such as likelihoods of receiving the missing PDUs at various durations and/or channel conditions, which may be based on buffer history related to receiving missing PDUs, current channel conditions, and the like. Predictive model 924 may take into account information related to the accumulation of PDUs in the packet buffer, which may include channel conditions, congestion, estimated numbers of incoming packets, and the like. Predictive model 924 may take into account information related to capability and/or target parameters of receiving node 920, such latency and/or reliability targets and/or tolerances, quality-of-service (QoS) targets, buffer size, and the like. In some examples, the information is input to the ML algorithm as parameters to predictive model 924. Based on the inputs, the ML algorithm may output predicted optimized duration(s) to buffer packets and/or one or more parameters that can be used by packet buffer manager 922 to select/determine the duration to buffer packets.

In some examples, the information/parameters used by the ML algorithm may include one or more lower layer block error rates (BLERs) such as lower layer BLER(s), one or more numbers of hybrid automatic repeat request (HARQ) retransmissions used (e.g., by the network) to determine a HARQ delay, one or more numbers of HARQ retransmissions used to determine for a timer (e.g., such as the RLC reassembly timer), one or more numbers of RLC retransmissions used (e.g., by the network) to determine an RLC delay for a timer (e.g., such as the PDCP reordering timer), a maximum number of HARQ retransmissions used, a HARQ round trip time (RTT), reordering timer expiry history, reassembly timer history, one or more numbers of times a missing packet (e.g., PDU) is received, one or more prior time durations at which one or more missing packets (e.g., a hole) are received, a minimum prior time duration at which one or more missing packets are received, a time taken to transmit an uplink status PDU, a maximum prior time duration at which one or more missing packets are received, a histogram of holes receives in one or more time duration bins, a throughput for a radio bearer associated with the one or more packets, a traffic type associated with the one or more packets, one or more logical channel identifiers (LCIDs) associated with the packets, amount of memory left for buffering, one or more radio resource control (RRC) configurations, one or more dual connectivity configurations, one or more evolved universal mobile telecommunications system (UMTS) terrestrial radio access (EUTRA) new radio (NR) dual connectivity (ENDC) configurations, a delay between dual connectivity links, a tune away time, a gain state, an average signal to noise ratio (SNR), geolocation information, carrier information, a number of active component carriers, one or more split bearer configurations, overall CPU utilization, clock frequency, numerology, downlink (DL) transport block (TB) size, a transport block size, uplink (UL) grant size, average packet data convergence protocol (PDCP) packet size, a time division duplex (TDD) configuration, a frequency division duplex (FDD) configuration, an application profile, a radio bearer mode, a single subscriber identify module (SSIM) configuration, a multiple SIM (MSIM) configuration, a modem operation conditions, application data protocol, a quality-of-service (QoS) profile associated with the application, or a combination thereof.

As BLER increases, more time is required to receive missing packets. Similarly, as HARQ delay, HARQ retransmissions, RLC retransmissions, and/or HARQ RTT increases, more time is required to receive missing packets. As the time taken to feedback UL status increases, the time taken to retransmit missing packets also increases. Thus, the parameters can be used by the machine learning algorithm to determine a duration to buffer packets based on a predicted time to receive missing packets.

Some traffic types may be able to suffer some packet losses, and hence, more aggressive reordering may still be fine since it helps in reducing latency. Thus, traffic type can be used by the machine learning algorithm to determine a duration to buffer packets.

The machine learning algorithm can use the EN-DC configuration parameter to account for additional delay in the master cell group (MCG) link and secondary cell group (SCG) link.

Available buffer memory decides how long the UE can wait for missing packets. History of data depicts the performance of the system with its associated parameters during the past reordering timer expiry events and reassembly timer history. Throughput parameter along with the traffic type can help to decide how much of a portion of throughput increase can be obtained with the ML determination. Tune Away time and MSIM mode provide the period of time UE has no radio resource to receive the data and affects the time the missing packets won't arrive. This is in contrast to SSIM mode, where radio resources are available to receive the data.

The TB can have more than one PDCP packet, with both the sizes along with numerology, active number of component carriers, FDD or TDD configuration. Based on these parameters, the machine learning algorithm can tell how many PDUs will be received in a given time, which can be used to train the model on what is the system capacity to receive X number of packets in Y time Geo-location and carrier information can be used to train the model on the localization of the data used to determine the pattern in future seen in the same area by the same carrier (e.g., network operator).

The logical channel identity associated with the specific application (e.g., traffic type) can be used to determine how different timer value predictions can be tailored to the specific need of the logical channel.

Modem operating conditions may include thermal conditions, battery consumption, and/or other modem conditions. The modem conditions influence the modem capability and/or effectiveness to recover the missing packets/holes. The modem conditions can be used to train the ML algorithm to predict the buffering duration needed to recover missing packets/holes.

In some cases, the parameters are provided separately for different links, such as for LTE and NR links in the case of EN-DC. In some examples, the input parameters and/or the output determined packet buffer durations can be per LCD. In some cases, the input parameters may include historical values (e.g., stored past values of the parameters) associated with the one or more parameters. In some cases, the input parameters may be provided per carrier. In some cases, the input parameters may be provided per radio bearer.

According to certain aspects, a machine learning algorithm may be enabled once the machine learning algorithm has been trained to a satisfactory level. For example, the machine learning algorithm may be enabled or use based at least in part on reaching a threshold rate of the machine learning algorithm successfully predicting time durations for receiving missed packets. The machine learning algorithm may be enabled per use on a per radio bearer basis. The machine learning algorithm may be enabled based at least in part on an application type attached to the radio bearer.

Output of the machine learning algorithm can include a time duration, per radio bearer, to buffer packets. Output of the machine learning algorithm can include a predicted time duration to wait for a specified portion of missing PDUs. The portion of missing PDUs may include a number of packets to maintain a maximum application throughput.

After packet buffer manager 922 uses predictive model 924 to determine the packet buffer duration, receiving node 920 applies determined packet buffer duration 925. In some examples, packet buffer manager 922 updates, replaces, and/or overrides a configured timer value. As shown in FIG. 9, packet buffer manager 922 can detect an out-of-order or missing packet 926 and initiate packet buffer timer 928 with determined packet buffer duration 925. In some cases, receiving node 920 may initiate the packet buffer timer with a configured duration and, while the timer is running, may determine a time to early exit before the timer expires. In some cases, the receiving node 920 may determine a time longer than the configured timer to buffer packets.

At expiry of timer 930, packet buffer manager 922 can flush the buffer. For example, packet buffer manager 922 can send packets to upper layers 932 and/or indicate missing packets to upper layers 934. In case of PDCP, once the PDCP reordering timer expires, the PDCP receiver entity can deliver the cache the PDUs to upper layer to reduce the memory consumption. In case of RLC, once the RLC reassembly timer expires, the RLC receiver entity can send the RLC control PDU for transmission to the transmitter entity to indicate a NACK (e.g., and to request retransmission of the NACKed packet).

Figure 10:
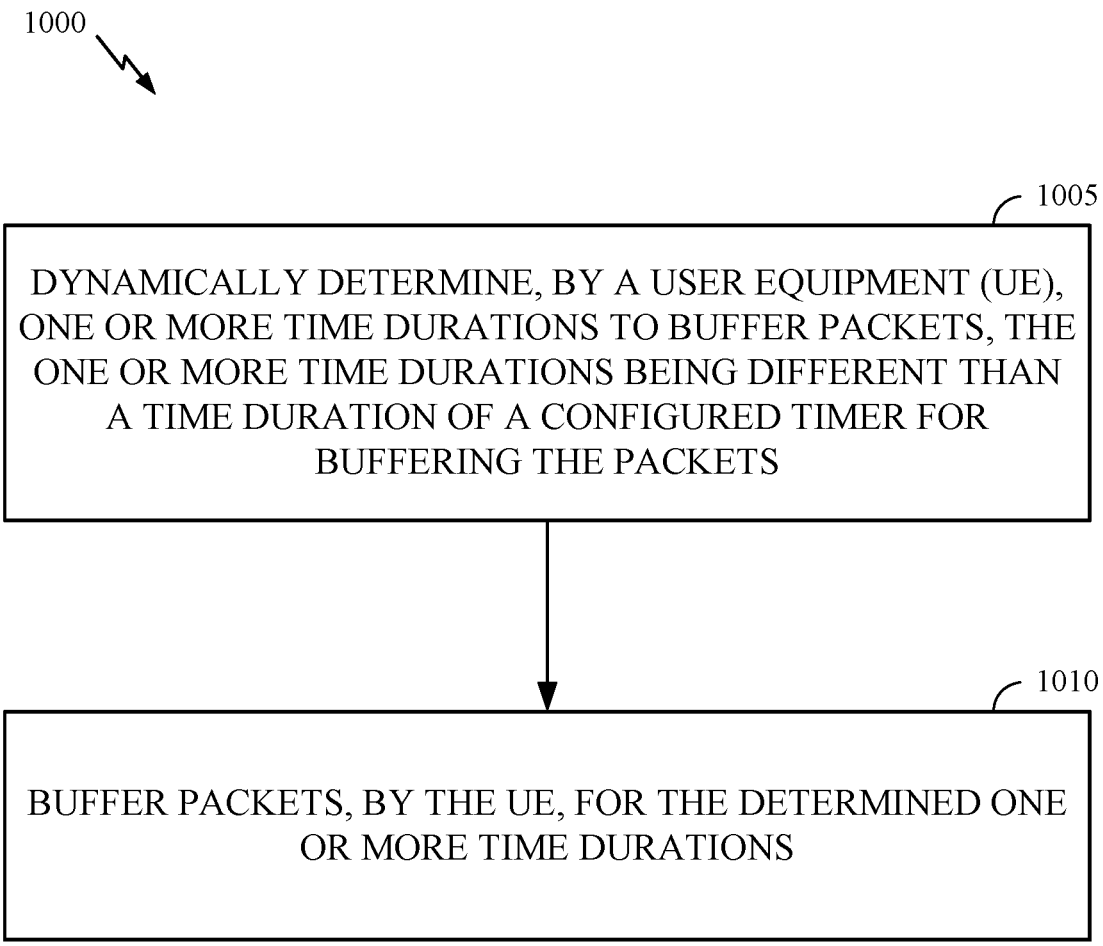
FIG. 10 is a flow diagram illustrating example operations for wireless communication by a receiving node, in accordance with certain aspects of the present disclosure.

FIG. 10 is a flow diagram illustrating example operations 1000 for wireless communication, in accordance with certain aspects of the present disclosure.

The operations 1000 may be performed, for example, by a receiving node, such as a UE (e.g., UE 120a in the wireless communication network 100) or a B S (e.g., B S 110a in wireless communication network 100). When the receiving node is a UE, operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. When the receiving node is a BS, operations 1000 may be implemented as software components that are executed and run on one or more processors (e.g., controller/processor 240 of FIG. 2). Further, the transmission and reception of signals the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1000 may begin, at 1005, by dynamically determining one or more time durations to buffer packets. The one or more time durations can be different than a time duration of a configured timer for buffering the packets. In some examples, the determined time duration is shorter than a configured timer duration for buffering the packets.

In some examples, the receiving node uses a machine learning algorithm to determine the time duration to buffer packets. In some examples, the receiving node inputs one or more parameters associated with determining the time duration to buffer packets to the machine learning algorithm. For example, the one or more parameters can include one or more lower layer BLERs, one or more numbers of HARQ retransmissions used to determine a HARQ delay for a reassembly timer, one or more numbers of RLC retransmissions used to determine an RLC delay for a reordering timer, reordering timer expiry history, reassembly timer history, one or more numbers of times a missing packet is received, one or more prior time durations at which a missing packet is received, a minimum prior time duration at which a missing packet is received, a maximum prior time duration at which a missing packet is received, one or more LCIDs associated with the packets, amount of memory left for buffering, one or more RRC configurations, one or more ENDC configurations, one or more split bearer configurations, overall CPU utilization, clock frequency, numerology, DL TB size, UL grant size, or a combination thereof.

In some examples, the receiving node inputs a first set of parameters for an LTE link with an eNB and inputs a second set of parameters for a 5G NR link with a gNB. The receiving node can obtain a first time duration output from the machine learning algorithm for the LTE link and obtain a second time duration output from the machine learning algorithm for the 5G NR link. In some examples, the receiving node determines a packet, of a sequence of packets, is missing, and determines the first time duration or the second time duration based on whether the missing packet is associated with the LTE link or the 5G NR link.

In some examples, using the machine learning algorithm to determine the time duration includes using a first machine algorithm to determine a first time duration, using a second machine learning algorithm to determine a second time duration, and selecting the first or second time duration.

In some examples, using the machine learning algorithm to determine the time duration to buffer packets includes using the machine learning algorithm to estimate one or more probabilities of receiving one or more missing packets at different time durations and selecting one of the different time durations based on the estimated one or more probabilities and a number of buffered packets associated with the different time durations.

In some examples, the receiving node inputs one or more parameters associated with one or more probabilities of receiving one or more missing packets at different time durations, one or more parameters associated with numbers of buffered packets associated with different time durations, or both to the machine learning algorithm. In this case, the receiving node may obtain the time duration to buffer the packets output from the machine learning algorithm.

In some examples, the receiving node determines the time duration based, at least in part, on a LCID associated with the packets.

At 1010, the receiving node buffers packets for the determined one or more time durations. In some examples, the configured timer is a RLC reassembly timer or reordering timer and the buffering is at the RLC layer of the receiving node. In some examples, the configured timer is a PDCP reordering timer and the buffering is at the PDCP layer of the receiving node. In some examples, the receiving node detects a missing packet, initiates the configured timer and halts buffering after the determined time duration. In some examples, the receiving node detects a missing packet, determining an updated timer duration based on the determined time duration, and initiates the timer with the updated timer duration.

In some examples, after buffering packets for the determined time duration, the receiving node flushes a first protocol layer buffer containing the buffered packets and sends the buffered packets to a second protocol layer, where the first protocol layer is a lower protocol layer than the second protocol layer.

In some examples, after buffering packets for the determined time duration, the receiving node sends a RLC status PDU, from a first protocol layer to a second protocol layer, indicating one more missing PDUs for retransmission, where the second protocol layer is a lower layer than the first protocol layer.

Figure 11:
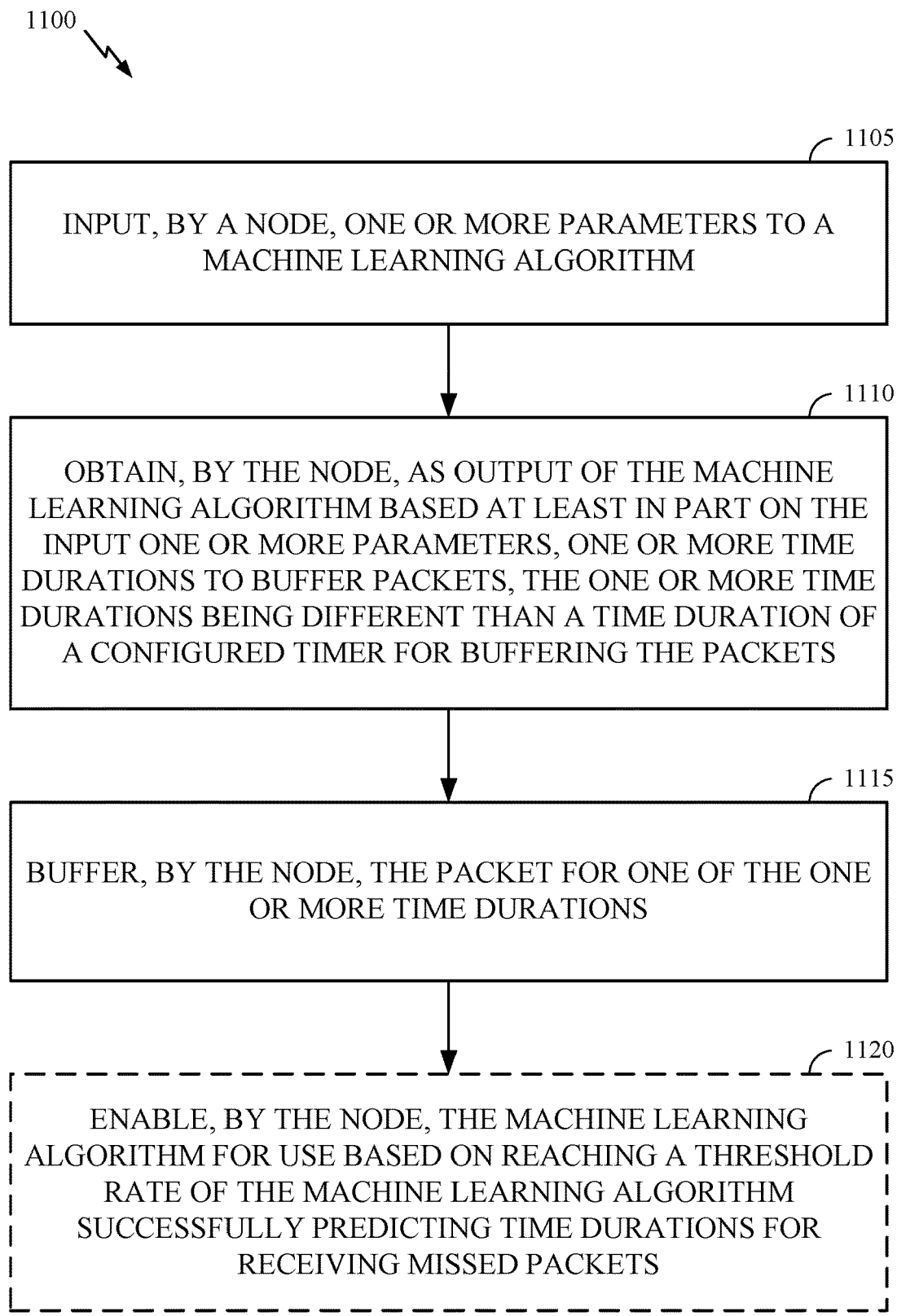
FIG. 11 is another flow diagram illustrating example operations for wireless communication by a receiving node, in accordance with certain aspects of the present disclosure.

FIG. 11 is another flow diagram illustrating example operations 1100 for wireless communication, in accordance with certain aspects of the present disclosure.

Operations 1100 may be performed, for example, by a receiving node, such as a UE (e.g., UE 120*a* in wireless communication network 100) or a BS (e.g., BS 110*a* in the wireless communication network 100). When the receiving node is a UE, operations 1100 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. When the receiving node is a BS, operations 1000 may be implemented as software components that are executed and run on one or more processors (e.g., controller/processor 240 of FIG. 2). Further, the transmission and reception of signals the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1100 may begin, at 1105, by inputting one or more parameters to a machine learning algorithm. At 1110, the node obtains, as output of the machine learning algorithm based at least in part on the input one or more parameters, one or more time durations to buffer packets. The one or more time durations are different than a time duration of a configured timer for buffering the packets. At 1115, the node buffers the packets for one of the one or more time durations. Optionally, at 1120, the node may enable the machine learning algorithm for use based on reaching a threshold rate of the machine learning algorithm successfully predicting time durations for receiving missed packets.

Figure 12:
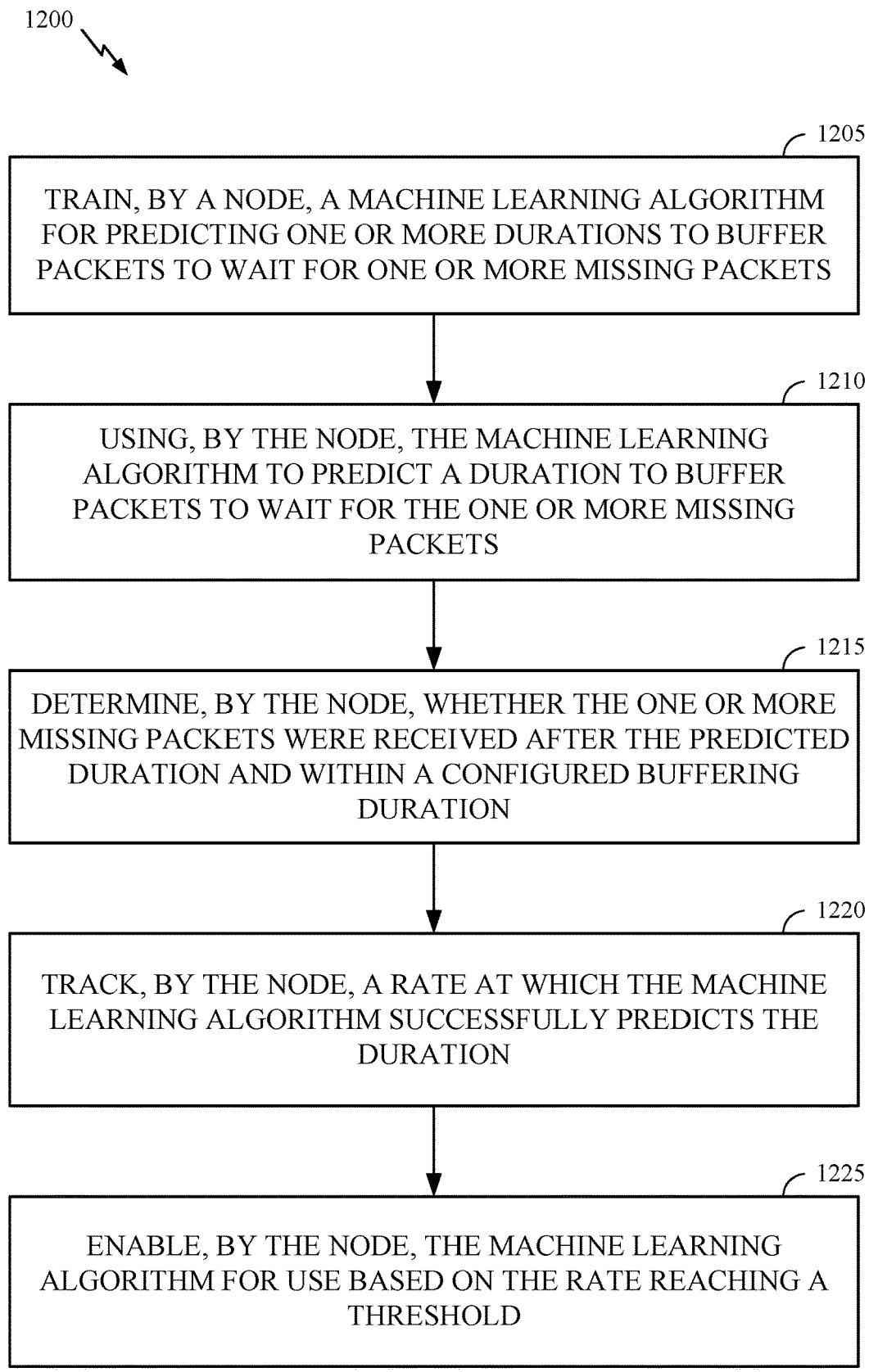
FIG. 12 is another flow diagram illustrating example operations for wireless communication by a receiving node, in accordance with certain aspects of the present disclosure.

FIG. 12 is another flow diagram illustrating example operations 1100 for wireless communication, in accordance with certain aspects of the present disclosure.

Operations 1200 may be performed, for example, by a receiving node, such as a UE (e.g., UE 120*a* in wireless communication network 100) or a BS (e.g., BS 110*a* in the wireless communication network 100). When the receiving node is a UE, operations 1100 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. When the receiving node is a BS, operations 1200 may be implemented as software components that are executed and run on one or more processors (e.g., controller/processor 240 of FIG. 2). Further, the transmission and reception of signals the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1200 may begin, at 1205, by training a machine learning algorithm for predicting one or more durations to buffer packets to wait for one or more missing packets. At 1210, the node uses the machine learning algorithm to predict a duration to buffer packets to wait for the one or more missing packets. The machine learning algorithm may still be being trained and the predicted duration may be used to test the accuracy of the predictive model of the machine learning algorithm, although the machine learning algorithm may not yet be enable for use. At 1215, the node determines whether the one or missing packets were received after predicted duration and within a configured buffer duration. If so, then the predicted duration is considered inaccurate. That is, the buffer would have been flushed early, as the missing one or more packets were received within the configured buffering duration. If the packets were not received within the configured buffering duration, then the predicted duration is considered accurate. At 1220, the node tracks a rate at which the machine learning algorithm successfully predicts the duration. At 1225, the node enable the machine learning algorithm for use based the rate reaching a threshold. Thus, the machine learning algorithm may be used for determining buffering duration once the predictive model is trained to a target accuracy level.

Figure 13:
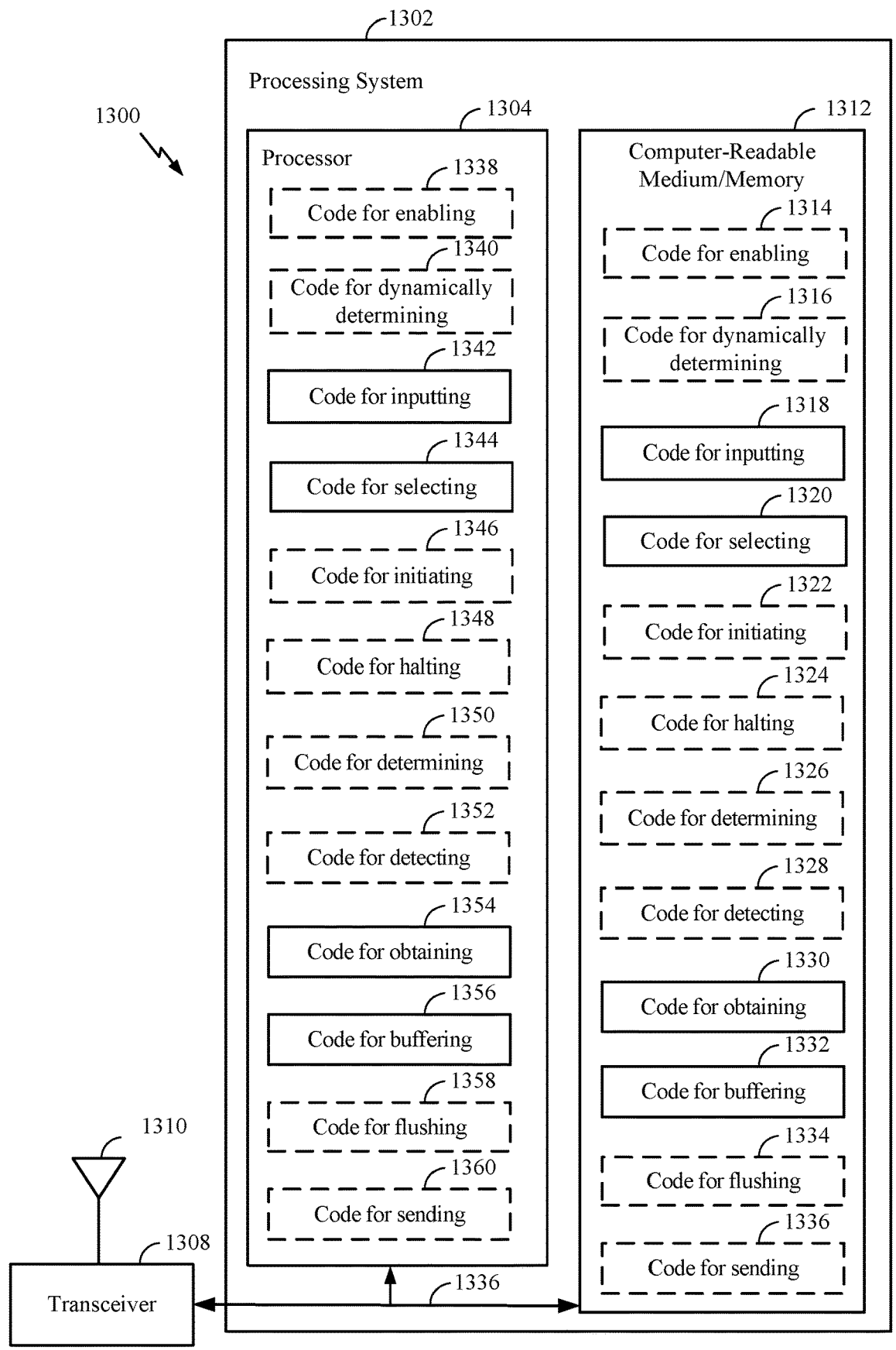
FIG. 13 illustrates a communications device that may include various components configured to perform operations for the techniques disclosed herein, in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10, FIG. 11, and/or FIG. 12. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, FIG. 11, and/or FIG. 12, or other operations for performing the various techniques discussed herein for BFD on a second band based on measurements on a first band. In certain aspects, computer-readable medium/memory 1312 stores code 1314 for enabling; code 1316 for dynamically determining; code 1318 for inputting; code 1320 for selecting; code 1322 for initiating; code 1324 for halting; code 1326 for determining; code 1328 for detecting; code 1330 for obtaining; code 1332 for buffering; code 1334 for flushing; and/or code 1336 for sending, in accordance with aspects of the disclosure. In certain aspects, the processor 1304 has circuitry configured to implement the code stored in the computer-readable medium/memory 1312. The processor 1304 includes circuitry 1338 for enabling; circuitry 1340 for dynamically determining; circuitry 1342 for inputting; circuitry 1344 for selecting; circuitry 1346 for initiating; circuitry 1348 for halting; circuitry 1350 for determining; circuitry 1352 for detecting; circuitry 1354 for obtaining; circuitry 1356 for buffering; circuitry 1358 for flushing; and/or circuitry 1360 for sending, in accordance with aspects of the disclosure.

Example Aspects

In addition to the various aspects described above, the aspects can be combined. Some specific combinations of aspects are detailed below:

Aspect 1. A method for wireless communications by a node, comprising: inputting one or more parameters to a machine learning algorithm; obtaining, as output of the machine learning algorithm based at least in part on the input one or more parameters, one or more time durations to buffer packets, the one or more time durations being different than a time duration of a configured timer for buffering the packets; and buffering the packets for one of the one or more time durations.

Aspect 2. The method of aspect 1, wherein at least one of the one or more time durations is shorter than the time duration of the configured timer.

Aspect 3. The method of any of aspects 1-2, wherein at least one of the one or more time durations is longer than the time duration of the configured timer.

Aspect 4. The method of any of aspects 1-3, wherein: the configured timer comprises a radio link control (RLC) reassembly timer or reordering timer; and buffering the packets comprises buffering the packets at an RLC layer of the node.

Aspect 5. The method of any of aspects 1-4, wherein: the configured timer comprises a packet data convergence protocol (PDCP) reordering timer; and buffering the packets comprises buffering the packets at a PDCP layer of the node.

Aspect 6. The method of any of aspects 1-5, wherein the one or more parameters further includes historical values associated with the one or more parameters.

Aspect 7. The method of any of aspects 1-6, wherein the one or more parameters comprise one or more lower layer block error rates (BLERs).

Aspect 8. The method of any of aspects 1-7, wherein the one or more parameters comprise one or more numbers of hybrid automatic repeat request (HARQ) retransmissions used to determine a HARQ delay.

Aspect 9. The method of any of aspects 1-8, wherein the one or more parameters comprise one or more numbers of radio link control (RLC) retransmissions used to determine an RLC delay.

Aspect 10. The method of any of aspects 1-9, wherein the one or more parameters comprise one or more dual connectivity configurations of the apparatus.

Aspect 11. The method of any of aspects 1-10, wherein the one or more parameters comprise one or more of: reordering timer expiry history, reassembly timer expiry history, one or more numbers of times one or more missing packets are received, one or more prior time durations at which one or more missing packets are received, a minimum prior time duration at which one or more missing packets are received, a maximum prior time duration at which one or more missing packets are received, one or more logical channel identifiers (LCIDs) associated with the packets, amount of memory left for buffering, one or more radio resource control (RRC) configurations, one or more evolved universal mobile telecommunications system (UMTS) terrestrial radio access (EUTRA) new radio (NR) dual connectivity (ENDC) configurations, one or more split bearer configurations, overall CPU utilization, clock frequency, numerology, downlink (DL) transport block (TB) size, uplink (UL) grant size, a maximum number of hybrid automatic repeat request (HARQ) retransmissions used, a HARQ round trip time (RTT), a time taken to transmit an uplink status protocol data unit (PDU), a histogram of holes receives in one or more time duration bins, a throughput for a radio bearer associated with the one or more packets, a traffic type associated with the one or more packets, a delay between dual connectivity links, a tune away time, a gain state, an average signal to noise ratio (SNR), geo-location information, carrier information, a number of active component carriers, transport block size, average packet data convergence protocol (PDCP) packet size, a time division duplex (TDD) configuration, a frequency division duplex (FDD) configuration, an application profile, a radio bearer mode, a single subscriber identify module (SSIM) configuration, a multiple SIM (MSIM) configuration, a modem operation conditions, application data protocol, a quality-of-service (QoS) profile associated with the application, or a combination thereof.

Aspect 12. The method of aspect 11, wherein one or more of the one or more parameters are per carrier parameters.

Aspect 13. The method of any of aspects 1-12, further comprising enabling the machine learning algorithm for use based at least in part on reaching a threshold rate of the machine learning algorithm successfully predicting time durations for receiving missed packets.

Aspect 14. The method of any aspects 1-13, further comprising enabling the machine learning algorithm for use, per radio bearer, based at least in part on an application type attached to the radio bearer.

Aspect 15. The method of aspect 14, wherein the obtaining comprises obtaining, as the output of the machine learning algorithm, a time duration, per radio bearer, to buffer packets.

Aspect 16. The method of any of aspects 1-15, wherein the inputting comprises inputting to the machine learning algorithm a first set of parameters for a first link with a first node; and inputting to the machine learning algorithm a second set of parameters for a second link with a second node; wherein the output of the machine learning algorithm comprises: a first time duration for the first link and a second time duration for the second link.

Aspect 17. The method of aspect 16, further comprising determining a packet, of a sequence of packets, is missing; inputting the first set of parameters when the missing packet is associated with the first link; and inputting the second set of parameters when the missing packet is associated with the second link.

Aspect 18. The method of any of aspects 1-17, further comprising inputting second one or more parameters to a second machine learning algorithm to determine a second one or more time durations; and selecting the one or more time durations as opposed to the second one or more time durations to buffer packets.

Aspect 19. The method of any of aspects 1-18, wherein the output of the machine learning algorithm comprises a predicted time duration to wait for a specified portion of missing protocol data units (PDUs).

Aspect 20. The method of aspect 19, wherein the portion of missing PDUs comprises a number of packets to maintain a maximum application throughput.

Aspect 21. The method of any of aspects 1-20, wherein the obtaining comprises obtaining, as the output of the machine learning algorithm, a probability, for each of the one or more time durations, of receiving one or more missing packets, and further comprising selecting the one of the one or more time durations based, at least in part, on the estimated probability.

Aspect 22. The method of any of aspects 1-21, wherein the node comprises a user equipment (UE) or a base station (BS).

Aspect 23. The method of any of aspects 1-22, further comprising detecting a missing packet; initiating the configured timer; and halting the buffering after the one of the one or more time durations.

Aspect 24. The method of any of aspects 1-23, further comprising detecting a missing packet; determining an updated timer duration based on the one of the one or more time durations; and initiating the configured timer with the updated timer duration.

Aspect 25. The method of any of aspects 1-24, further comprising after buffering the packets for the one of the one or more time durations: flushing a first protocol layer buffer containing the buffered packets; and sending the buffered packets to a second protocol layer, wherein the first protocol layer is a lower protocol layer than the second protocol layer.

Aspect 26. The method of any of aspects 1-25, further comprising after buffering the packets for the one of the one or more time durations, sending a radio link control (RLC) status packet data unit (PDU), from a first protocol layer to a second protocol layer, wherein the RLC status PDU indicates one more missing PDUs for retransmission, and wherein the second protocol layer is a lower layer than the first protocol layer.

Aspect 27. The method of any of aspects 1-27, wherein the obtaining comprising obtaining, as output of the machine learning algorithm, additional one or more time durations to buffer packets at one or more different times.

Aspect 28. A method by a receiving node, comprising: dynamically determining one or more time durations to buffer packets, the one or more time durations being different than a time duration of a configured timer for buffering the packets; and buffering packets for the determined one or more time durations.

Aspect 29. The method of aspect 28, wherein at least one of the determined one or more time durations is shorter than a configured timer duration for buffering the packets.

Aspect 30. The method of any of aspects 28 and 29, wherein: the configured timer comprises a radio link control (RLC) reassembly timer or reordering timer; and buffering the packets comprises buffering the packets at an RLC layer of the receiving node.

Aspect 31. The method of any of aspects 28-30, wherein: the configured timer comprises a packet data convergence protocol (PDCP) reordering timer; and buffering the packets comprises buffering the packets at a PDCP layer of the receiving node.

Aspect 32. The method of any of aspects 28-31, wherein determining the one or more time durations comprises using a machine learning algorithm to determine the one or more time durations to buffer packets.

Aspect 33. The method of aspect 32, wherein using the machine learning algorithm to determine the one or more time durations comprises: inputting one or more parameters associated with determining the one or more time durations to buffer packets to the machine learning algorithm.

Aspect 34. The method of any of aspects 28-33, wherein: the one or more parameters comprise one or more lower layer block error rates (BLERs), one or more numbers of hybrid automatic repeat request (HARQ) retransmissions used to determine a HARQ delay for a reassembly timer, one or more numbers of radio link control (RLC) retransmissions used to determine an RLC delay for a reordering timer, reordering timer expiry history, reassembly timer history, one or more numbers of times a missing packet is received, one or more prior time durations at which a missing packet is received, a minimum prior time duration at which a missing packet is received, a maximum prior time duration at which a missing packet is received, one or more logical channel identifiers (LCIDs) associated with the packets, amount of memory left for buffering, one or more radio resource control (RRC) configurations, one or more evolved universal mobile telecommunications system (UMTS) terrestrial radio access (EUTRA) new radio (NR) dual connectivity (ENDC) configurations, one or more split bearer configurations, overall CPU utilization, clock frequency, numerology, downlink (DL) transport block (TB) size, uplink (UL) grant size, or a combination thereof.

Aspect 35. The method of any of aspects 32-34, wherein: inputting the one or more parameters to the machine learning algorithm comprises: inputting a first set of parameters for a first link with a first node, and inputting a second set of parameters for a second link with a second node.

Aspect 36. The method of aspect 35, further comprising: obtaining a first time duration output from the machine learning algorithm for the first link, and obtaining a second time duration output from the machine learning algorithm for the second link.

Aspect 37. The method of any of aspects 35-36, further comprising: determining a packet, of a sequence of packets, is missing, wherein determining the time duration comprises determining the first time duration or the second time duration based on whether the missing packet is associated with the first link or the second link.

Aspect 38. The method of any of aspects 32-37, wherein using the machine learning algorithm to determine the one or more time durations comprises: using a first machine algorithm to determine a first time duration; using a second machine learning algorithm to determine a second time duration; and selecting the first or second time duration.

Aspect 39. The method of any of aspects 32-38, wherein the using the machine learning algorithm to determine the one or more time durations to buffer packets comprises: using the machine learning algorithm to estimate one or more probabilities of receiving one or more missing packets at different time durations; and selecting one of the different time durations based on the estimated one or more probabilities.

Aspect 40. The method of any of aspects 33-39, wherein inputting the one or more parameters to the machine learning algorithm comprises: inputting one or more parameters associated with one or more probabilities of receiving one or more missing packets at different time durations to the machine learning algorithm.

Aspect 41. The method of aspect 40, further comprising: obtaining the one or more time durations to buffer the packets output from the machine learning algorithm.

Aspect 42. The method of any of aspects 28-41, wherein determining the one or more time duration comprises determining the one or more time durations based, at least in part, on a logical channel identifier (LCID) associated with the packets.

Aspect 43. The method of any of aspects 28-42, wherein the node comprises a user equipment (UE) or a base station (BS).

Aspect 44. The method of any of aspects 28-43, wherein buffering packets for at least one of the determined one or more time durations comprises: detecting a missing packet; initiating the configured timer; and halting buffering after the determined time duration.

Aspect 45. The method of any of aspects 28-43, wherein buffering packets for at least one of the determined one or more time duration comprises: detecting a missing packet; determining an updated timer duration based on the determined time duration; and initiating the timer with the updated timer duration.

Aspect 46. The method of any of aspects 28-45, further comprising: after buffering packets for at least one of the determined one or more time durations, flushing a first protocol layer buffer containing the buffered packets and sending the buffered packets to a second protocol layer, wherein the first protocol layer is a lower protocol layer than the second protocol layer.

Aspect 47. The method of any of claims 28-46, further comprising: after buffering packets for at least one of the determined one or more time durations, sending a radio link control (RLC) status packet data unit (PDU), from a first protocol layer to a second protocol layer, indicating one more missing PDUs for retransmission, wherein the second protocol layer is a lower layer than the first protocol layer.

Aspect 48. The method of any of aspects 28-47, wherein dynamically determining the one or more time durations to buffer packets comprises redetermining the time duration at different times.

Aspect 49. A method for wireless communication by a node, comprising: determining a rate of a machine learning algorithm successfully predicting time durations for receiving one or more missing packets; and enabling the machine learning algorithm for use based at least in part on the rate reaching a threshold rate.

Aspect 50. The method of aspect 49, further comprising: training the machine learning algorithm for predicting the one or more time durations to buffer packets to wait for one or more missing packets; using the machine learning algorithm to predict a time duration to buffer packets to wait for the one or more missing packets; determining whether the one or missing packets were received after the predicted time duration and within a configured buffer duration; determining the rate based, at least in part, on the whether the one or missing packets are received after the predicted time duration and within the configured buffer duration; and comparing the determined rate to the threshold to determine whether the threshold rate is reached.

Aspect 51. The method of aspects 49 or 50, wherein enabling the machine algorithm further comprises enabling the machine learning algorithm for use, per radio bearer, based at least in part on an application type attached to the radio bearer.

Aspect 52. An apparatus comprising means for performing the method of any of aspects 1 through 51.

Aspect 53. An apparatus comprising at least one processor and a memory coupled to the at least one processor, the memory comprising code executable by the at least one processor to cause the apparatus to perform the method of any of aspects 1 through 51.

Aspect 54. A computer readable medium storing computer executable code thereon for wireless communications that, when executed by at least one processor, cause an apparatus to perform the method of any of aspects 1 through 51.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10, FIG. 11, and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, the apparatus comprising:
   a memory storing computer executable code; and
   one or more processors coupled with the memory and configured to, individually or collectively, cause the apparatus to:
      determine, based at least in part on one or more parameters, one or more time durations to buffer packets at a radio link control (RLC) layer and/or a packet data convergence protocol (PDCP) layer, the one or more time durations being different than a time duration of a configured timer for buffering the packets, wherein the one or more parameters comprise one or more lower layer block error rates (BLERs); and
      buffer the packets for one of the determined one or more time durations.

2. The apparatus of claim 1, wherein at least one of the one or more time durations is shorter than the time duration of the configured timer.

3. The apparatus of claim 1, wherein at least one of the one or more time durations is longer than the time duration of the configured timer.

4. The apparatus of claim 1, wherein:
   the configured timer comprises a PDCP reordering timer or a RLC reassembly timer or reordering timer.

5. The apparatus of claim 1, wherein the one or more parameters further includes historical values associated with the one or more parameters.

6. The apparatus of claim 1, wherein the one or more processors are further configured to cause the apparatus to, after buffering the packets for the one of the one or more time durations, send a RLC status packet data unit (PDU), from a first protocol layer to a second protocol layer, wherein the RLC status PDU indicates one more missing PDUs for retransmission, and wherein the second protocol layer is a lower layer than the first protocol layer.

7. The apparatus of claim 1, wherein the one or more parameters comprise one or more numbers of hybrid automatic repeat request (HARQ) retransmissions used to determine a HARQ delay.

8. The apparatus of claim 1, wherein the one or more parameters comprise one or more numbers of RLC retransmissions used to determine an RLC delay.

9. The apparatus of claim 1, wherein the one or more parameters comprise one or more dual connectivity configurations of the apparatus.

10. The apparatus of claim 1, wherein the one or more parameters comprise one or more of: reordering timer expiry history, reassembly timer expiry history, one or more numbers of times one or more missing packets are received, one or more prior time durations at which one or more missing packets are received, a minimum prior time duration at which one or more missing packets are received, a maximum prior time duration at which one or more missing packets are received, one or more logical channel identifiers (LCIDs) associated with the packets, amount of memory left for buffering, one or more radio resource control (RRC) configurations, one or more evolved universal mobile telecommunications system (UMTS) terrestrial radio access (EUTRA) new radio (NR) dual connectivity (ENDC) configurations, one or more split bearer configurations, overall CPU utilization, clock frequency, numerology, downlink (DL) transport block (TB) size, uplink (UL) grant size, a maximum number of hybrid automatic repeat request (HARQ) retransmissions used, a HARQ round trip time (RTT), a time taken to transmit an uplink status protocol data unit (PDU), a histogram of holes receives in one or more time duration bins, a throughput for a radio bearer associated with the one or more packets, a traffic type associated with the one or more packets, a delay between dual connectivity links, a tune away time, a gain state, an average signal to noise ratio (SNR), geo-location information, carrier information, a number of active component carriers, transport block size, average packet data convergence protocol (PDCP) packet size, a time division duplex (TDD) configuration, a frequency division duplex (FDD) configuration, an application profile, a radio bearer mode, a single subscriber identify module (SSIM) configuration, a multiple SIM (MSIM) configuration, a modem operation conditions, application data protocol, a quality-of-service (QoS) profile associated with the application, or a combination thereof.

11. The apparatus of claim 10, wherein one or more of the one or more parameters are per carrier parameters.

12. The apparatus of claim 1, wherein the one or more time durations is determined by a machine learning algorithm.

13. The apparatus of claim 1, wherein the apparatus comprises a user equipment (UE) or a base station (BS).

14. The apparatus of claim 1, wherein the memory at least one processor are further configured to:
   detect a missing packet;
   initiate the configured timer; and
   halt the buffering after the one of the one or more time durations.

15. The apparatus of claim 1, wherein the one or more processors are further configured to cause the apparatus to:
   detect a missing packet;
   determine an updated timer duration based on the one of the one or more time durations; and
   initiate the configured timer with the updated timer duration.

16. The apparatus of claim 1, wherein the one or more processors are further configured to cause the apparatus to, after buffering the packets for the one of the one or more time durations:
   flush a first protocol layer buffer containing the buffered packets; and
   send the buffered packets to a second protocol layer, wherein the first protocol layer is a lower protocol layer than the second protocol layer.

17. A method for wireless communications by a node, the method comprising:
   determining, based at least in part on one or more parameters, one or more time durations to buffer packets at a radio link control (RLC) layer and/or a packet data convergence protocol (PDCP) layer, the one or more time durations being different than a time duration of a configured timer for buffering the packets, wherein the one or more parameters comprise one or more lower layer block error rates (BLERs); and
   buffering the packets for one of the determined one or more time durations.

18. An apparatus for wireless communications, the apparatus comprising:
   means for determining based at least in part on one or more parameters, one or more time durations to buffer packets at a radio link control (RLC) layer and/or a packet data convergence protocol (PDCP) layer, the one or more time durations being different than a time duration of a configured timer for buffering the packets, wherein the one or more parameters comprise one or more lower layer block error rates (BLERs); and
   means for buffering the packets for one of the determined one or more time durations.

19. A non-transitory computer readable medium storing computer executable code thereon for wireless communications by a node, the computer executable code comprising:
   code for determining based at least in part on one or more parameters, one or more time durations to buffer packets at a radio link control (RLC) layer and/or a packet data convergence protocol (PDCP) layer, the one or more time durations being different than a time duration of a configured timer for buffering the packets, wherein the one or more parameters comprise one or more lower layer block error rates (BLERs); and
   code for buffering the packets for one of the determined one or more time durations.

* * * * *